US011728972B2

(12) United States Patent
Sierra et al.

(10) Patent No.: US 11,728,972 B2
(45) Date of Patent: *Aug. 15, 2023

(54) METHODS AND ARCHITECTURES FOR SECURE RANGING

(71) Applicant: APPLE INC., Cupertino, CA (US)

(72) Inventors: Yannick L. Sierra, San Francisco, CA (US); Zhimin Chen, San Jose, CA (US); Thomas Icart, Paris (FR)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/848,922

(22) Filed: Jun. 24, 2022

(65) Prior Publication Data

US 2022/0399994 A1    Dec. 15, 2022

Related U.S. Application Data

(63) Continuation of application No. 16/643,237, filed as application No. PCT/US2018/040701 on Jul. 3, 2018, now Pat. No. 11,405,185.

(Continued)

(51) Int. Cl.
*H04L 9/08* (2006.01)
*G01S 13/76* (2006.01)
(Continued)

(52) U.S. Cl.
CPC .......... *H04L 9/0822* (2013.01); *G01S 13/765* (2013.01); *H04L 63/1441* (2013.01);
(Continued)

(58) Field of Classification Search
CPC ......... H04L 9/08; H04L 9/0822; H04L 9/002; H04L 9/0838; H04L 9/0872;
(Continued)

(56) References Cited

U.S. PATENT DOCUMENTS 10,080,185 B2  9/2018 Escott et al.
11,405,185 B2  8/2022 Sierra et al.
(Continued)

FOREIGN PATENT DOCUMENTS

| CN | 101668289 A | 3/2010 |
|---|---|---|
| CN | 107015234 A | 8/2017 |
| WO | 2010085877 A1 | 8/2010 |
| WO | 2016164164 A1 | 10/2016 |

OTHER PUBLICATIONS

Notice of Allowance issued in U.S. Appl. No. 16/643,237, dated Mar. 25, 2022 in 11 pages.
Office Action issued in European Application No. EP18745762.7, dated May 18, 2021 in 5 pages.
(Continued)

*Primary Examiner* — Shaqueal D Wade-Wright
(74) *Attorney, Agent, or Firm* — Kilpatrick Townsend & Stockton LLP

(57) ABSTRACT

Embodiments described herein enable the generation of cryptographic material for ranging operations in a manner that reduces and obfuscates potential correlations between leaked and secret information. One embodiment provides for an apparatus including a ranging module having one or more ranging sensors. The ranging module is coupled to a secure processing system through a hardware interface to receive at least one encrypted ranging session key, the ranging module to decrypt the at least one encrypted ranging session key to generate a ranging session key, generate a sparse ranging input, derive a message session key based on the ranging session key, and derive a derived ranging key via a key derivation cascade applied to the message session key and the sparse ranging input, the derived ranging key to encrypt data transmitted during a ranging session.

20 Claims, 9 Drawing Sheets

Related U.S. Application Data

(60) Provisional application No. 62/564,947, filed on Sep. 28, 2017.

(51) Int. Cl.
   *H04L 9/40* (2022.01)
   *H04W 12/03* (2021.01)
   *H04W 12/041* (2021.01)

(52) U.S. Cl.
   CPC ......... *H04W 12/03* (2021.01); *H04W 12/041* (2021.01); *H04L 9/0872* (2013.01); *H04L 63/0428* (2013.01); *H04L 63/0492* (2013.01)

(58) Field of Classification Search
   CPC ............... H04L 9/3297; H04L 9/003; H04L 63/1441; H04L 63/1475; H04L 63/0428; H04L 63/0492; H04L 63/14; H04W 12/03; H04W 12/041; H04W 12/009; H04W 12/125; H04W 12/50; H04W 12/63
   See application file for complete search history.

(56) References Cited

U.S. PATENT DOCUMENTS

| | | |
|---|---|---|
| 2007/0099646 A1 | 5/2007 | Tanaka et al. |
| 2015/0033016 A1* | 1/2015 | Thornton ............. H04L 9/0869 713/171 |
| 2016/0007315 A1 | 1/2016 | Lundgreen et al. |
| 2017/0250806 A1 | 8/2017 | Phillips et al. |
| 2017/0359169 A1 | 12/2017 | Benson et al. |
| 2019/0116619 A1* | 4/2019 | Hauck .................. H04W 12/02 |
| 2020/0220719 A1 | 7/2020 | Chaudhari et al. |
| 2020/0228331 A1* | 7/2020 | de Perthuis ........... H04L 9/0872 |

OTHER PUBLICATIONS

Cao et al., "The Application of FPGA in Test Instrument of Laser Ranger Circuits", Information of Microcomputer, vol. 25, Issue 1-2, 2009 in 3 pages.

Office Action issued in China Application No. CN201880054753.7, dated Feb. 18, 2023 in 5 pages.

\* cited by examiner

METHODS AND ARCHITECTURES FOR SECURE RANGING

CROSS-REFERENCES TO RELATED APPLICATIONS

This application is a Continuation of U.S. application Ser. No. 16/643,237, filed on Jul. 3, 2018, which claims priority to International Patent Application No. PCT/US2018/40701, filed Jul. 3, 2018, which claims priority to U.S. Provisional Patent Application No. 62/564,947 filed Sep. 28, 2017, each of which is hereby incorporated herein by reference.

TECHNICAL FIELD

This disclosure relates generally to the field of secure ranging. More specifically, this disclosure relates to a system that enhances the resistance of a secure ranging system from adversarial attack.

BACKGROUND

Secure ranging describes concepts such as authenticated ranging and distance bounding. In authenticated ranging, a verifier entity measures a distance to another authentic entity while denying an attacking entity (the attacker) the chance to interfere with the measurement by, for example, shorten the measured distance. Distance bounding enables the verifier to obtain an upper-bound on the distance to an untrusted prover. Various cryptographic techniques can be applied during secure ranging to protect the privacy and security of authentic devices that particulate in the ranging operations.

During secure ranging operations, the cryptographic technique applied to secure the operations may be vulnerable to side channel attacks. Side channel attacks take advantage of physical measurements of a computing device that implements a cryptographic system. Such attacks attempt to correlate those measurements with the internal state of the device. An attacker then attempts to use that correlation to discover information related to the cryptographic keys used by the system. Protecting a secure ranging system against side channel attacks may be resource intensive, and can complicate the development of electronic devices that implement secure ranging.

SUMMARY OF THE DESCRIPTION

Secure ranging, through the use of ranging codes which are independently generated by or derived from one or more ranging keys and inputs, can be used in wireless communication between devices, such as between two smartphones or a smartphone or wearable device, and/or other devices such as a motorized vehicle. Secure ranging allows the devices to separately determine the distance or range between the devices based on the time of flight of the received signals. Secure ranging mutual authentication can be used to provide an increased level of security against relay attacks for wireless interaction. Once mutually authenticated the devices can gain the assurance that they are close to one another and they may engage in further interactions Embodiments described herein enable the generation of cryptographic material for ranging operations in a manner that reduces and obfuscates potential correlations between leaked and secret information. One embodiment provides for an apparatus including a ranging module having one or more ranging sensors. The ranging module is coupled to a secure processing system through a hardware interface to receive at least one encrypted ranging session key, the ranging module to decrypt the at least one encrypted ranging session key to generate a ranging session key, generate a sparse ranging input, derive a message session key based on the ranging session key, and derive a derived ranging key via a key derivation cascade applied to the message session key and the sparse ranging input, the derived ranging key to encrypt data transmitted during a ranging session.

One embodiment provides for a method of securing a ranging operation, the method comprising receiving a ranging session key and an anti-replay counter value, the anti-replay counter value used to generate a secure preamble for a ranging frame; deriving a message session key based on the ranging session key; generating a sparse ranging input based on the anti-replay counter value and diversification data; deriving a derived ranging key via the sparse ranging input and the message session key; and encrypting data transmitted within the ranging frame via the derived ranging key, wherein the ranging frame is a data packet transmitted or received during a ranging session of the ranging operation.

One embodiment provides for a data processing system comprising a secure processing system including a secure processor and a secure processor firmware, a secure boot read only memory (ROM) and a cryptographic accelerator and a secure storage for storing one or more private keys for use in a cryptographic system; an application processing system which includes a boot ROM and one or more system buses, the application processing system configured to execute one or more user applications and an operating system; a system memory coupled to one or more system buses to store the operating system and the one or more user applications; and a ranging module including one or more ranging sensors, the ranging module coupled to the secure processing system through a hardware interface to receive at least one encrypted ranging session key, the ranging module to decrypt the at least one encrypted ranging session key to generate a ranging session key, generate a sparse ranging input, derive a message session key based on the ranging session key, and derive a derived ranging key via a key derivation cascade applied to the message session key and the sparse ranging input, the derived ranging key to encrypt data transmitted during a ranging session.

Embodiments described herein can include methods, data processing systems, and non-transitory machine-readable media.

The above summary does not include an exhaustive list of all embodiments in this disclosure. All systems and methods can be practiced from all suitable combinations of the various aspects and embodiments summarized above, and also those disclosed in the Detailed Description below.

BRIEF DESCRIPTION OF THE DRAWINGS

The present invention is illustrated by way of example and not limitation in the figures of the accompanying drawings in which like references indicate similar elements.

DETAILED DESCRIPTION

Embodiments described provide a secure ranging system which, through the use of ranging codes that are independently generated by or derived from one or more ranging keys and inputs, can be used in wireless communication between devices, such as between two smartphones or a smartphone or wearable device, and/or other devices such as a motorized vehicle. During secure ranging operations, processing units used to perform cryptographic operations may leak information that can be captured by a side channel attack on the secure ranging system. Countermeasures to side channel attacks include reducing the leaking of information that can be correlated with secret data and/or reducing the correlation between leaked data and secret data. Both techniques can be applied to secure a system. However, reducing information leakage can increase the cost, weight, complexity, power consumption, and/or latency associated with the electronic devices that use secure ranging. Furthermore, even small correlations between leaked and secret data can compromise the security of a system.

Embodiments described herein enable the generation of cryptographic material for ranging operations in a manner that reduces and obfuscates potential correlations between leaked and secret information. Additionally, embodiments can enable enhanced security relative to secure ranging systems known in the art and can enhance user privacy by reducing the ability of electronic devices to be tracked via wireless emissions. The techniques described herein can also be applied to reduce the expense and design complexity associated with the physically shielding cryptographic accelerators to reduce information leakage during secure ranging operations.

Various aspects of multiple embodiments will be described below. Additionally, the drawings accompanying the description will be used to illustrate details of the embodiments. However, the following description and accompanying drawings should be considered to be illustrative, rather than limiting, of the described embodiments, as, in certain instances, well-known or conventional details may not be described to enable a concise discussion of the embodiments.

Reference herein to "one embodiment" or "an embodiment" means that a particular feature, structure, or characteristic described in conjunction with the embodiment can be included in at least one embodiment. The appearances of the phrase "in one embodiment" in various places in the specification do not necessarily all refer to the same embodiment. The processes depicted in the figures that follow can be performed by processing logic including hardware (e.g. circuitry, dedicated logic, etc.), software, or a combination of both. Although the processes are described below in terms of some sequential operations, it should be appreciated that some of the operations described may be performed in a different order. Moreover, some operations may be performed in parallel rather than sequentially.

Figure 1A:
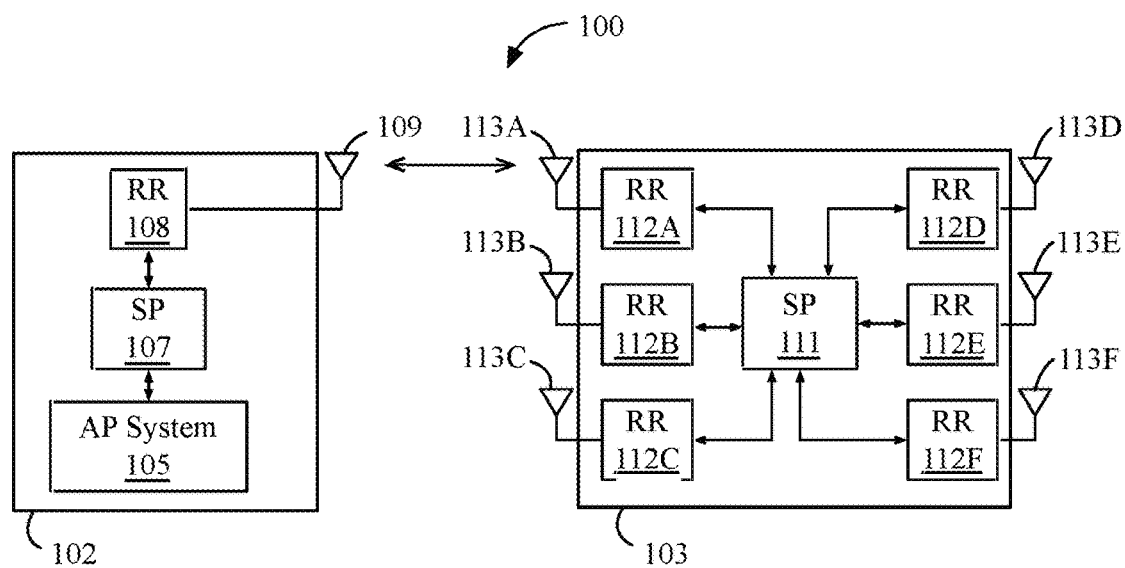
FIGS. 1A-1B illustrate exemplary systems for performing secure ranging between devices.
Figure 1B:
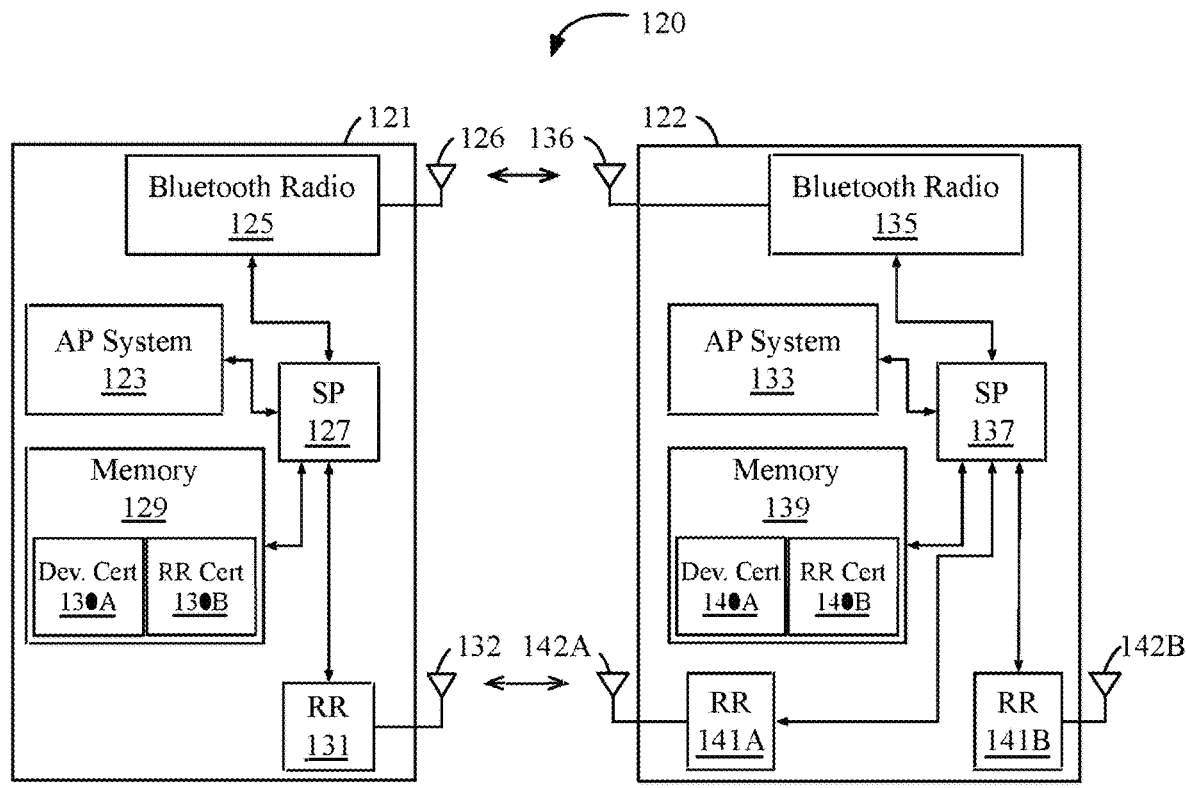

FIGS. 1A-1B illustrate exemplary systems for performing secure ranging between devices, according to embodiments described herein. FIG. 1A illustrates a system 100 that can be used to enable ultra-wide band (UWB) secure ranging between two devices. FIG. 1B illustrates a system 120 that can be used to enable secure ranging using Bluetooth and ultra-wide band radios.

As shown in FIG. 1A, secure ranging can be performed within a system 100 including a first device 102 and a second device 103. Device 102 can include a ranging radio (RR 108) and associated antenna 109, a secure processor (SP 107), and an application processor system (AP system 105). Device 103 can include multiple ranging radios (RR 112A-112F) and associated antennas 113A-113F, as well as a secure processor (SP 111). Device 102 can be for example, a smartphone, a tablet computer, a wearable device such as a smartwatch device, or another electronic device. Device 103 can be another electronic device or mobile system such as, for example, a motorized vehicle, mobile home, or automobile. In one embodiment, device 103 can be a lock on a door or entryway within a smart home system. Secure ranging can be used for automatic locking or unlocking in such systems. Additionally, secure ranging can be employed for any kind of security systems that can be activated or deactivated depending on the distance with a secured device, such as but not limited to alarms, cameras, blinds, etc.

Device 102 is illustrated as including an application processor system (AP system 105) that can execute user programs such as, but not limited to telephony or text messaging applications, or web browser applications, mapping applications, or other information, utility, or entertainment related applications. In one embodiment, Device 103 can omit an application processor, but may include special purpose processors tailored to perform specific tasks, without having the ability to execute general purpose applications.

Device 102 and Device 103 each include a type of secure processor (e.g., SP 107, SP 111). A secure processor is an integrated circuit that includes specialized logic for performing cryptographic operations. Secure processors can be embedded in a packaging that includes multiple physical security measures to enhance. Exemplary secure processors include a secure enclave processor (SEP), a secure element, or a trusted platform module (TPM). The secure processors (SP 107, SP 111) in each device can be the same or similar type of processors, or different secure processors that implement common cryptographic techniques. The secure processors can perform cryptographic operations for secure ranging, and can also enable additional security operations such as receiving and protecting user passcodes, fingerprints, or other private of confidential user data.

Device 102 can include one or more ranging radios (RR 108), coupled to one or more antennas (e.g., antenna 109). The ranging radio (RR 108) can be implemented as ultra-wide band radios that is similar to radios that implement the IEEE 802.15.4a standard. The ranging radio on device 102 can transmit pseudorandom ranging codes to ranging radios (RR 112A-112F) on device 103, and can receive transmissions of such codes. In one embodiment, two-way ranging can be employed in which the ranging radio (RR 108) on device 102 transmits a first code sequence to one or more of the ranging radios (RR 112A-112F) on device 103. Each of the receiving ranging radios on device 103 can respond with a code sequence which is transmitted back to the ranging radio (RR 108) on device 102. The ranging radios on device 103 can be coupled through one or more buses to the secure processor (SP 111) of device 103. SP 111 can be employed to perform cryptographic operations that are part of the secure ranging process for device 103. Likewise, SP 107 in device 102 can be coupled with RR 108 through one or more buses and can be employed to perform cryptographic operations that are part of the secure ranging process for device 102.

Device 103 is illustrated as having multiple ranging radios and antennas distributed around the periphery to allow triangulation to be used to determine a location of the second device 104 relative to device 102. The system 101 illustrates device 103 as having six ranging radios (RR 112A-112F) with corresponding antennas 113A-113F coupled to each radio. However, it will be appreciated that device 103 may use a reduced number of ranging radios with the same number of multiple antennas where the reduced number of ranging radios can perform time division multiplexing with the different antennas to provide the same result as six ranging radios.

In one embodiment, a first communication channel can be established using a different radio protocol or communication channel than the ranging communication channel. For example, a Bluetooth radio can be used on each device to establish a secure connection between the devices to then allow the secure elements on each device to perform a secure key exchange from which the ranging keys can be derived or generated. Bluetooth is described herein for power efficiency. However, some embodiments may exclude Bluetooth from use, as the secure ranging system described herein can be implemented using only ultra-wide band radios.

FIG. 1B illustrates a system 120 that can be used to enable secure ranging using Bluetooth and ultra-wide band radios. The system 120 of FIG. 1B includes a first device 121 and a second device 122. The device 121 includes a Bluetooth radio 125 and associated antenna 126. Device 122 also includes a Bluetooth radio 135 and associated antenna 136. Device 121 includes a ranging radio (RR 131) and associated antenna 132. Device 122 includes multiple ranging radios (RR 141A-141B) and associated antennas 142A-142B. In one embodiment, the Bluetooth radios 125, 135 can be used to establish a secure connection for use by secure processors (SP 127, SP 137) within the respective devices. The secure connection can be used to establish one or more ranging keys as described herein. The ranging keys can then be used to encrypt data transmitted during a ranging process. The application processing systems (AP 123, AP 133) each device can provide for the execution of user programs, such as but not limited to cellular telephony programs, navigation programs, text messaging programs, and the like. Moreover, these user application programs can provide user interfaces to allow a user to set up one device, such as a smartphone, to unlock another device, such as a car or vehicle or doorway, by merely walking up to the car with the smartphone in the user's pocket or purse, etc., or while the user is wearing a wearable device that is configured to unlock another device.

Each device 121, 122 in system 120 can include a memory (e.g., memory 129, memory 139) which can store cryptographic values or parameters, such as certificates which can be used in cryptographic operations to authenticate or encrypt or otherwise secure communications within a device and between the devices. For example, memory 129 on device 121 can include a certificate for the device (dev. cert 130A) as well as a certificate for the ranging radio within the device (RR cert 130B). Likewise, memory 139 on device 122 can include a certificate for the device (dev. cert 140A) as well as a certificate for the ranging radios within the device (RR cert 140B). In various embodiments, where a device includes multiple ranging radios, each ranging radio can be associated with a separate certificate or can share a common certificate. In one embodiment, the memories 129, 139 on the devices are accessible only by the secure elements (SP 107, SP 111) on the respective device. In one embodiment, the secure element processing system within each device is coupled to the Bluetooth radio and the ranging radios through a secure interface. In one embodiment, the secure interface can be similar to the secure interface between the secure enclave processor and the application processing system within the iPhone® device provided by Apple® Inc. of Cupertino Calif.

To prepare for secure ranging, key material can be exchanged using a wireless communication channel different from the one used by the ranging radios. When the devices in the range one from another to establish this initial wireless communication channel (e.g., over Bluetooth or, in some embodiments, Wi-Fi), a communication channel can be established to initiate the secure ranging communication. This initial communication channel can be encrypted to maintain secrecy of the initially exchanged material.

The underlying technology of the initial wireless communication channel (e.g., Bluetooth, Wi-Fi, etc.) can provide mutual authentication through pre-established pairing. In terms of privacy, Bluetooth Low Energy (from version 4.2) supports privacy-preserving channel establishment between already paired devices, allowing devices to use seemingly random identifiers. In one embodiment, a user can pair multiple electronic devices having Bluetooth and secure ranging radios. For example, a Bluetooth pairing can be performed between devices and this Bluetooth pairing can be used to initiate secure ranging operations using the secure ranging radios. For example, a user having a smartphone, smartwatch, or another personal electronic device, can perform a Bluetooth pairing between the smartphone or smartwatch and a Bluetooth equipped electronics system of a car or another motorized vehicle. This Bluetooth pairing can be used to establish a secure channel for an initial data exchange that can be performed to prepare for secure ranging.

Figure 2:
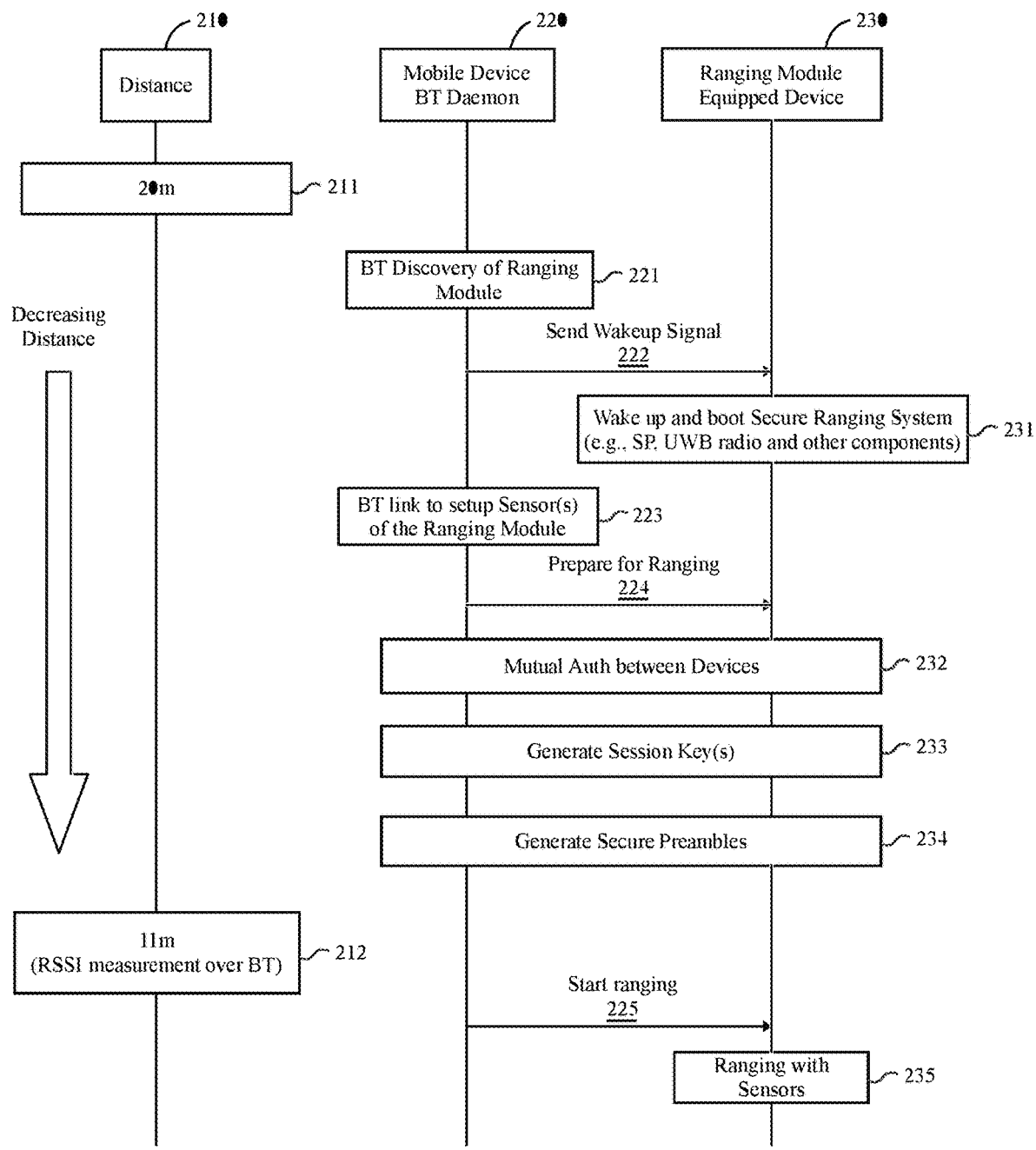
FIG. 2 is a diagram which illustrates initiation of a secure ranging operation, according to an embodiment.

FIG. 2 is a diagram which illustrates initiation of a secure ranging operation, according to an embodiment. A personal electronic device as described herein can include a mobile device Bluetooth daemon 220, which can be software or other logic that has access and authority to control a Bluetooth radio on the device. In one embodiment, a car or motorized vehicle can be a ranging module equipped device 230 that includes a ranging module having one or more ranging radios. For example, a ranging module within a motorized vehicle can control multiple ranging radios arranged around the periphery of a vehicle, as with the ranging radios (RR 112A-112F) of device 103 in FIG. 1A. The operation of the mobile device Bluetooth daemon 220 and ranging module equipped device 230 can be described as a function of distance 210 between the devices, which can be determined via wireless ranging techniques such as radio single strength indication (RSSI).

In one embodiment, as shown at block 221, at approximately 20 meters (211), the mobile device Bluetooth daemon 220 can initiate Bluetooth discovery of the ranging module on the ranging module equipped device 230. Bluetooth discovery of the ranging module can include sending a wakeup signal (222) to the ranging module equipped device 230. As shown at block 231, the wakeup signal (222)

can cause the ranging module equipped device 230 to wake up and boot the secure ranging system, where the secure ranging system can include secure processors (SP), ultra-wide band (UWB) radios, and other components that are used by the secure ranging system. Booting components of the secure ranging system can include loading one or more secure boot images from read-only or cryptographically secured memory within the ranging module equipped device 230.

As shown at block 223, the mobile device can establish a Bluetooth link for use to setup one or more sensors of the ranging module equipped device 230. Establishing the Bluetooth link can depend on a previously generated pairing between the devices. In one embodiment, the established Bluetooth link can be an encrypted Bluetooth link. The mobile device Bluetooth daemon 220 can then send a signal (224) to direct the ranging module to prepare for ranging operations. In response to signal 224, the ranging module equipped device can perform preparative operations for secure ranging including performing mutual authentication between the ranging module equipped device and the mobile device, as shown at block 232, generating one or more session keys on the ranging module equipped device and the mobile device, as shown at block 233, and generating a secure preamble, as shown at block 234.

In one embodiment, mutual authentication performed at block 232 can be performed using the Bluetooth link established at block 223. The Bluetooth link can be used to exchange device identifiers, keys, certificates, or other information that enables mutual authentication between the devices. This initial communication channel can be encrypted to maintain secrecy of the initially exchanged material. While a Bluetooth is illustrated as the medium over which initial ranging, communication, and authentication is performed, other wireless radio technologies, such as Wi-Fi, can also be used.

The session key generated at block 233 is the key material defining a secure ranging communication session. All operations within a session are derived from the session key. In one embodiment, communication with other entities or re-authentication with the same entity lead to the use of a different session key and would be considered a different session. In one embodiment, generation of the session key is performed by secure processors on the mobile device and the ranging module equipped device using a shared secret. Based on a previously performed operation or previously established relationship, secure processors in each device can have possession of the same secret value or can gain knowledge of a public key associated with the other device.

The secure preambles generated at block 234 are unpredictable signals for use during the secure ranging process. The flight time of the secure preambles is used to determine the distance between devices. The unpredictability of the secure preamble is to prevent an adversary from predicting the sequence signals and sending the sequence early to appear to be closer during the ranging process. The secure preamble can be generated in part based on an anti-replay counter value that is periodically incremented.

Once preparations for the secure ranging process are complete, the mobile device Bluetooth daemon 220 can send a start ranging signal (225) to the ranging module equipped device, which can then begin the ranging process using the ranging radio sensors, as shown at block 235. The ranging process can begin, in one embodiment, at a range of approximately 11 meters (212), as determined based on RSSI measurements over Bluetooth.

In one embodiment, secure ranging is performed in terms of frames, cycles, and sessions. A ranging frame is a single data packet that is sent or received during ranging. A ranging cycle is a repetitive pattern containing multiple exchanged frames. A ranging session is a set of ranging cycles that can last up to several minutes or hour, with some embodiments capable of maintaining the security of a single session for multiple days. A ranging session allows ranging endpoints to securely establish distances several times using a single set of agreed key material. For example, in one embodiment, the same session key is used within a ranging session and is used to derive key material defining the session. In such embodiment, the session key is generated by an application processor within one or more devices, while derived keys are generated by a secure processor or cryptographic engine. Maintaining the same session key for a session enables multiple ranging cycles to be performed without requiring the use of the application processor, which can be maintained in a low power state.

Figure 3A:
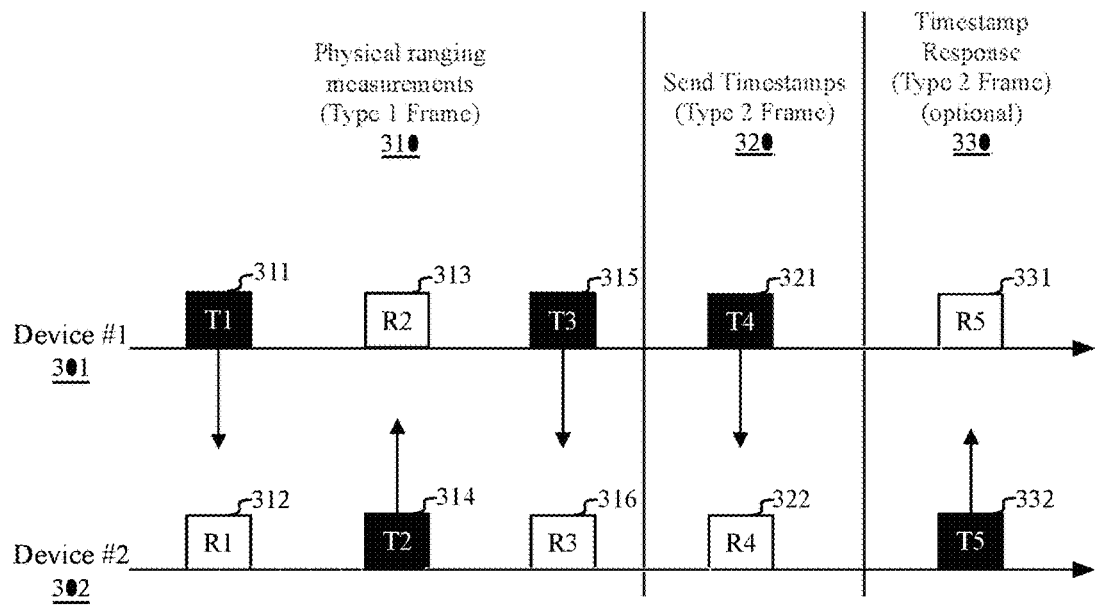
FIGS. 3A-3B illustrate secure ranging data exchange, as well as data frames that may be used to transmit the secure ranging data, according to embodiments described herein.
Figure 3B:
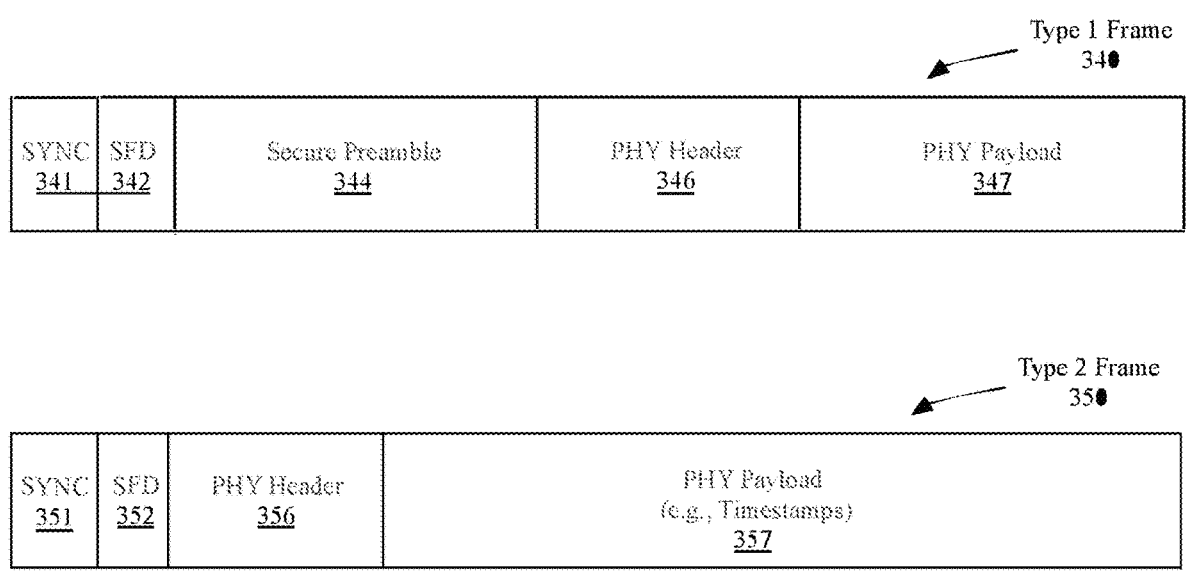

FIGS. 3A-3B illustrate secure ranging data exchange, as well as data frames that may be used to transmit the secure ranging data, according to embodiments described herein. FIG. 3A illustrates a data exchange between two devices, according to an embodiment. FIG. 3B illustrates a format for multiple types or data frames that can be exchanged during the secure ranging process. During a secure ranging data exchange, a transmitting device can transmit a ciphered code sequence and one or more encrypted time stamps. A receiving device can locally derive the ciphered code sequence and correlate the locally derived code sequence with the received code sequence. The devices also decrypt and verify transmitted timestamps. If the code sequences or timestamps do not validate the secure ranging process cannot proceed. In such scenario, the ranging radio can alert a secure processor within the device that an attacker is attempting to circumvent the secure ranging system.

As shown in FIG. 3A, a first device 301 and a second device 302 can perform a wireless data exchange during a secure ranging cycle. The secure ranging data exchange includes two or more phases; a first phase 310 in which physical ranging measurements are performed, a second phase 320 in which timestamps are exchanged, and a third, optional phase in which a timestamp response is sent. In one embodiment, data exchanged during the first phase uses a type 1 frame (e.g., type 1 frame 340 as in FIG. 3B), while data exchanged during the second phase 320 and the third phase 330 can use a type 2 frame (e.g., type 2 frame 350 as in FIG. 3B). The illustrated data exchange is performed between a mobile device and one or more ranging sensors (e.g., ranging radios) of a ranging module equipped device. However, embodiments additionally support ranging between multiple devices, such as multiple mobile devices, a mobile device and multiple ranging radios, or multiple mobile devices and one or more mobile devices.

During the first phase 310, physical ranging measurements are performed, in which data packets are exchanged between devices and measurements of the time of flight of the data packets are performed. Device 301 is illustrated as the initiating device, although either device may initiate the ranging process. Device 301 can send a first transmitted packet 311, which can be received as a first received packet 312 by Device 302. Device 302 can then send a second transmitted packet 314, which is received by device 301 as a second received packet 313. In response, device 301 can send a third transmitted packet 315, which can be received as a third received packet 316. Measurements of the flight time of packets can then be used by the devices to determine a range between the devices. In one embodiment, receive times for previously transmitted packets can be determined based on timestamps exchanged between devices during the second phase 320.

During the second phase 320, device 301 can send a fourth transmitted packet 321 that includes encrypted timestamp data. The encrypted timestamp data can be used an anti-replay mechanism for the secure ranging process and to enable precise distance measurements by sending a receive time for previously received packets. The packet can be received as a fourth received packet 322 by device 302, which can decrypt and verify the timestamp. An optional third phase 330 can be performed in some embodiments in which device 302 sends a fifth transmitted packet 332 with one or more encrypted timestamps, which is received by device 301 as a fifth received packet 331. In one embodiment, timestamps exchanged during the secure ranging process are encrypted using an authenticated encryption algorithm to enable authentication and confidentiality for the encrypted data. The authentication aspect of authenticated encryption provides assurances that an adversary has not modified timestamps reported during secure ranging. Output of the authenticated encryption process can include encrypted data, as well as an authentication tag in the form of a message authentication code. The authentication tag can be used to authenticate encrypted data to ensure that the data has not been tampered with during transmission. The decryption process for the encrypted data will return an error if the authentication tag does not match the encrypted data.

FIG. 3B illustrates an exemplary format for a type 1 frame 340 and a type 2 frame 350 used during a ranging cycle. The exemplary frame formats are based in part on formats defined by the IEEE 802.15.4 standard. In one embodiment the type 1 frame 340 and type 2 frame 350 each include a synchronization header (SYNC 341, SYNC 351) and a start frame delimiter (SFD 342, SFD 352) which can be respectively used to facilitate alignment and synchronization of the data stream and to mark the beginning of the frame. The type 1 frame 340 can include a secure preamble 344, which is an unpredictable waveform used as part of the security system of the secure ranging process. The secure preamble 344 can be generated in part based on an anti-replay counter.

Both the type 1 frame 340 and type 2 frame also include a physical-layer header (PHY header 346, PHY header 356) that can contain data such as the length of the respective frame. After the respective physical-layer headers, the frames contain physical layer payload data 347, 357. The physical layer payload data 347, 357 can include source and destination addresses within media access control (MAC) headers, as well as a data payload for each frame. Payload for the type 1 frame 340 can include, but is not limited to frame control data, security headers, frame count data, identifier data, and other information that may be used to facilitate security during the ranging process. Payload for the type 2 frame 350 can include similar data as the type 1 frame 340, and additionally includes encrypted timestamps exchanged during the second phase 320 or third phase 330 of the ranging process. The setup and data exchange of FIG. 2 and FIG. 3A-3B can be performed using the hardware architecture of FIG. 4. The generation of various keys used to encrypt exchanged data is further illustrated in FIG. 5 and FIG. 6.

Figure 4:
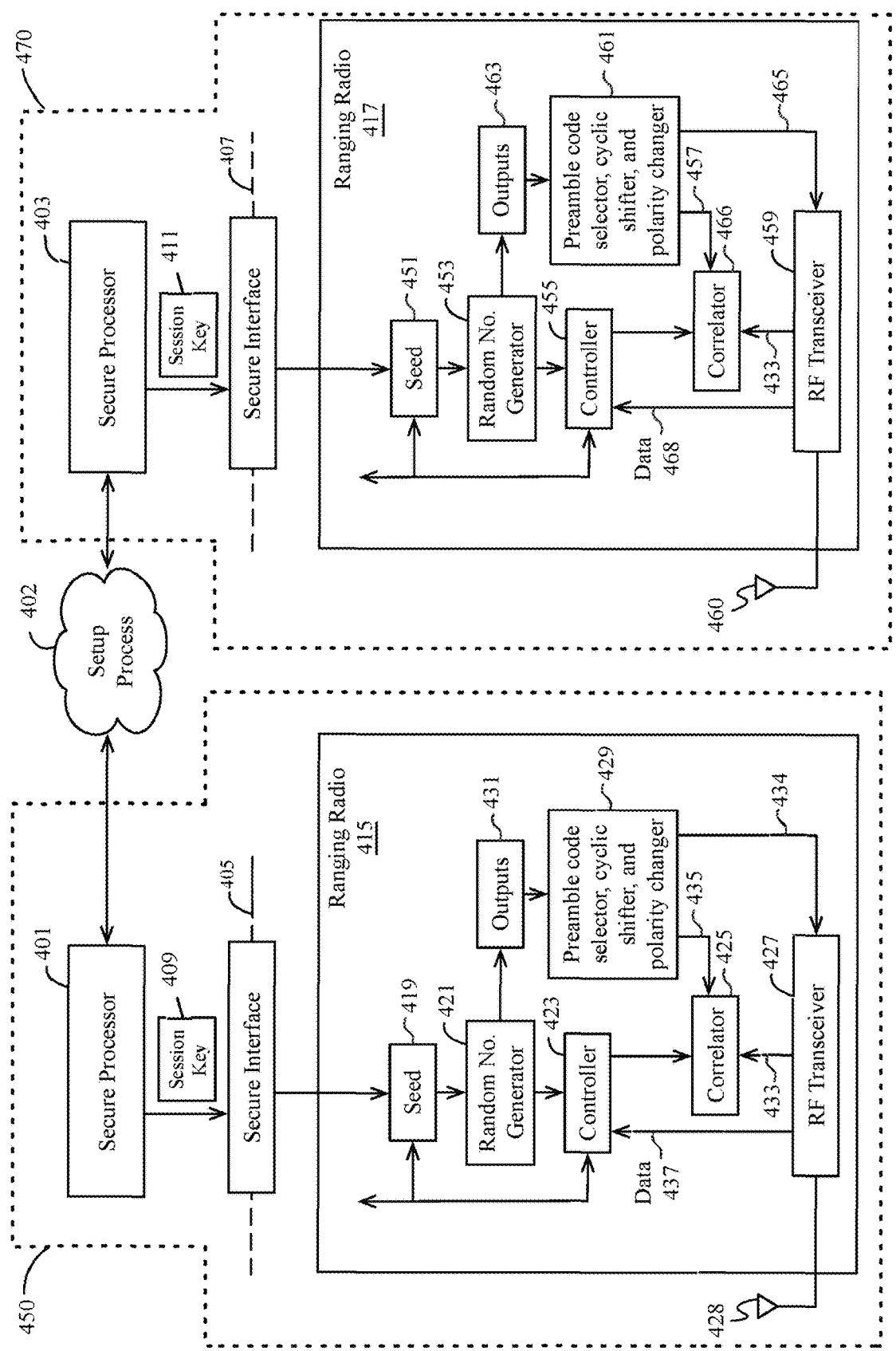
FIG. 4 illustrates a system for performing secure ranging between two devices, according to an embodiment.

FIG. 4 illustrates an exemplary system for performing secure ranging between two devices, according to an embodiment. A first device 450 and a second device 450 are illustrated, each of which can be any of the electronic devices described herein. In one embodiment, as each of device 450 and device 470 are capable of locally and independently generating a ciphered code sequence for transmission or correlation. Device 450 includes the secure processor 401, which can be any secure processor described herein. The secure processor 401 can couple with a ranging radio 415 through a secure interface 405. Similarly, device 470 includes a secure processor 403 coupled with a ranging radio 417 through a secure interface 407. The secure interfaces 405 and 407, in one embodiment, are secure interface circuits that provide enhanced security to the data connection between the ranging radios 415, 417, and the secure processors 401, 403.

As illustrated, the secure processors 401, 403, through a setup process 402, can perform a secure key exchange to exchange key material that is used to generate a session key (e.g., session key 409, 411). The setup process 402 can be performed over a secure Bluetooth or Wi-Fi connection and can proceed as illustrated in FIG. 2. On each device 450, 470, a session key 409, 411 can be generated, encrypted, and transmitted over the secure interface 405, 407 to the corresponding ranging radio 415, 417 on the device 450, 470. Each device 450, 470 can then separately and independently derive key material and ciphered code sequences from the session key. The session key can then be combined with session parameters, such as a session identifier, sequence identifier, transmitter identifier, or a combination of such session parameters to create a seed 419 and this seed can then be used as an input to a random number generator 421. The seed 419 can be a concatenation (or other combination) of the session key 409 and the one or more session parameters.

In one embodiment, a seed 419 for ranging radio 415 can be created after ranging radio 415 receives the encrypted session key 409 and associated data key. Ranging radio 415 will decrypt the encrypted session key 409 and combine the session key 409 with session parameters, such as a session identifier or sequence identifier or transmitter identifier or a combination of such session parameters, to create a seed 419. The seed 419 can be used as input to a random number generator 421. In one embodiment, combining the session key 409 with the additional parameters can be performed by a processing unit within the device, which can be a central processor or another processing unit outside of the secure processor 401 and ranging radio 415. In various embodiments, the random number generator 421 can be a pseudo random number generator (PRNG), such as a deterministic random bit generator (DRBG), or can be implemented using a pseudo random function (PRF) family. In one embodiment, the random number generator 421 is a cryptographically secure pseudo-random number generator (CSPRNG). In such embodiments, the random number generator 421 is configured to operate in a deterministic manner, to generate the same sequence of random numbers for a given seed. The sequence of random numbers can be generated by using a counter or other incrementor to cause the random number generator 421 to output the sequence of random numbers, as outputs 431, based upon a particular seed. Those outputs 431 can then be further processed, in one embodiment, by a cyclic shifter 429 (e.g., preamble code selector, cyclic shifter, and polarity changer) which can select a preamble code, cyclic shift the output and also invert polarity of one or more bits. In general, the ranging radio 415 is to create waveforms that are correlated and decoded by the receiver. The described process is but one technique that can be used to generate such waveforms, as other techniques can also be used.

The results of the preamble code selector, cyclic shifter, and polarity changer can be provided as output 434 to either a correlator 425 or to RF transceiver 427. When ranging radio A is transmitting to the other ranging radios, then the output from cyclic shifter 429 is provided through output 434 to the transmitter of the RF transceiver 427 to allow the transmission of the ciphered code sequence through antenna 428 for receipt by other ranging radios, such as ranging radio 417. When the ranging radio 415 is receiving ciphered code sequences, then the receiver in the RF transceiver 427 can provide an output 433, which is the received code sequence, to the correlator 425. The correlator 425 also receives the output 435 from the cyclic shifter 429 to perform the correlation operation to determine whether the ciphered code sequence matches the locally generated ciphered code sequence on output 435. However, the generation of waveforms is not required to be performed before correlation is performed for received waveforms. The correlator 425 can also be used to perform a ranging operation using techniques that are known in the art.

The output of the correlation operation performed by the correlator 425 can be provided to a controller 423 which can indicate both the range and also whether or not the ciphered code sequences match. The controller 423 can provide the session parameters to be combined into the seed 419 and can also communicate with the secure processor 401 to indicate whether the secure ranging operation was successful. In one embodiment, data 437 received by the RF transceiver 427 can also transmitted to the controller 423.

Ranging radio 417 can work in a similar fashion as ranging radio 415 and includes similar elements such as a random number generator 453 which produces outputs 463 which can then be shifted and inverted using the cyclic shifter 461 to provide two outputs, one output 457 to the correlator 466 and the other output 465 to the RF transceiver 459 and antenna 460. A controller 455 can provide and keep track of the session parameters which can be provided as an input along with the session key 411 to create a seed 451. The seed 451 can then be input to a random number generator 453. Additionally, data 468 received by RF transceiver can be transmitted to the controller 455.

In one embodiment, parameters that specify the particular preamble code, cyclic shift and polarity change for a particular output from the deterministic random number generator (DRNG) can be included within one or more portions of the particular output from the DRNG (e.g., random number generators 421 and 453), and these parameters can be used by cyclic shifters 429, 461 to perform the particular shift and inversion specified by these portions of the particular output from the DRNG.

In one embodiment, various techniques may be implemented to harden against side-channel attacks on the system. A side-channel attack is an attempt to compromise the security of the system based on information leaks from physical implementation of the system, (e.g., power consumption, electromagnetic leaks, etc.) and can be resisted by reducing information leakage or eliminating correlations between the leaked information and secret information. Resistance against side-channel attacks can be implemented at various points within the cryptographic processes. In one embodiment, overall performance of the system can be improved by focusing protection against side-channel attacks to the construction of the initial state of the DRNG. Once the process to generate the initial state is hardened against side-channel attacks, the need to implement side-channel countermeasures during the various cryptographic operations is reduced.

Figure 5:
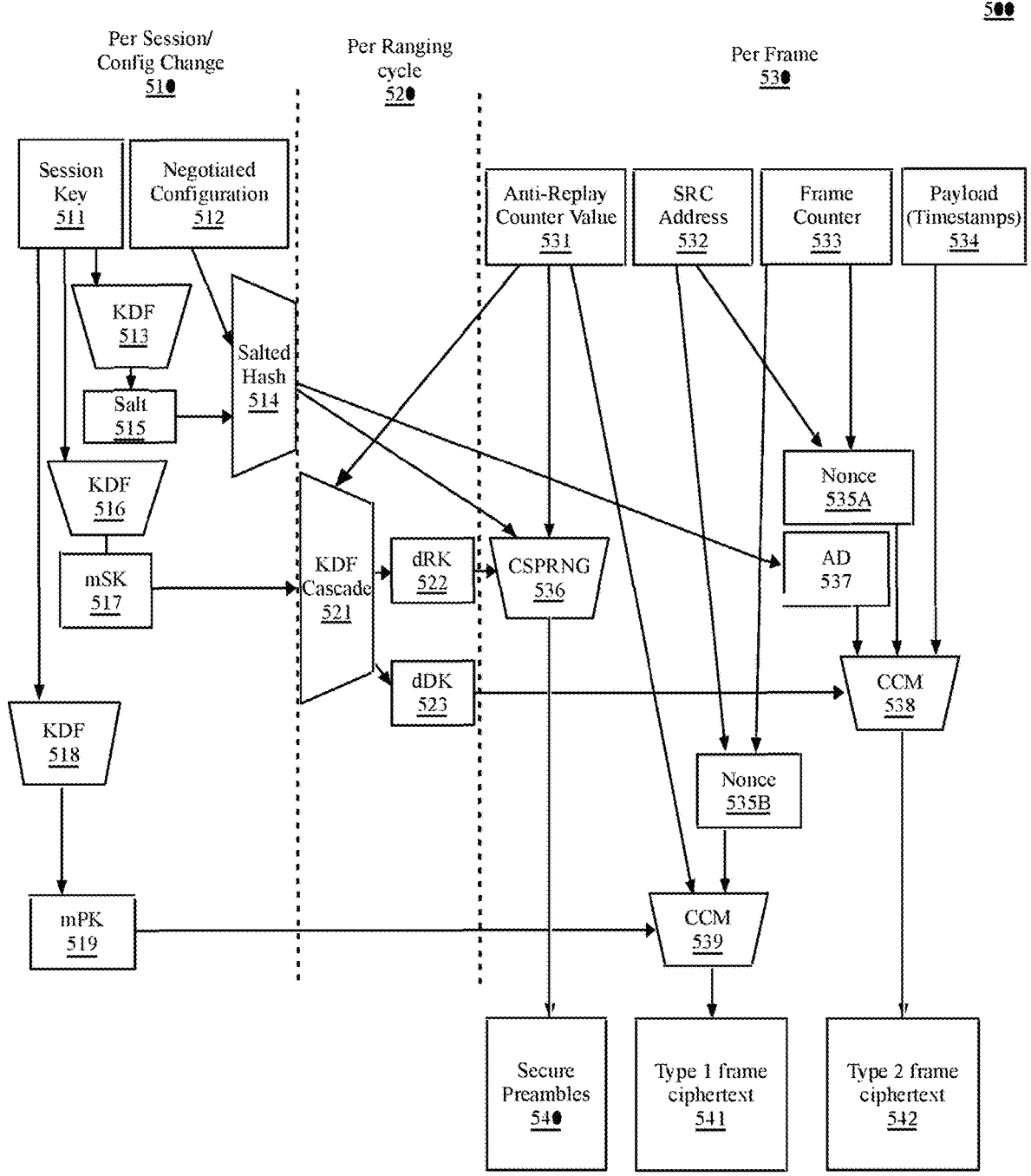
FIG. 5 illustrates key derivation for a secure ranging system, according to embodiments described herein.

FIG. 5 illustrates a key derivation system 500 for secure ranging, according to embodiments described herein. The illustrated key derivation system 500 enables enhanced security, privacy, and side channel attack resistance of the cryptosystem by reducing the attack profile presented during secure ranging. The key derivation system 500 can derive or generate new keys or cryptographic material for each session or configuration change, for each ranging cycle, and for each frame. Generated or derived per-session/configuration input and key material 510 includes the session key 511 and negotiated configuration 512 as inputs, which are used to generate a salt 515, salted hash 514, a message session key (mSK 517), and a privacy key (mPK 519). Per-cycle key material 520 includes a derived ranging key (dRK 522) and derived data key (dDK 523). Per frame cryptographic material 530 includes nonce values 535A-535B and authenticated data (AD 537). In one embodiment, the authenticated data includes the per-session salted hash 514, while the nonce values 535A-535B are generated based on a combination of input data including a source address 532 and frame counter 533 associated with a ranging frame. The authenticated data 537 can be used as additional authenticated data (AAD) to enable authenticated encryption of payload data 534. The anti-replay counter value 531 is used as input to generate secure preambles 540 and type 1 frame ciphertext 541. In one embodiment an initial value for the anti-replay counter can be coordinated between the devices over a Bluetooth or other radio wireless connection. The value of the anti-replay counter can then be incremented during timeslots in which transmission or receipt of a type 1 frame is expected. Payload data 534, including timestamp data, is used as input to generate type 2 frame ciphertext 542.

For each session or configuration change, the key derivation system derives material based on a session key 511 and a negotiated configuration 512. The session key 511 can be the same or similar to other session keys described herein (session key 409, session key 411, etc.). At the beginning of each session, the session key 511 is used to derive multiple elements of cryptographic material (e.g., salt 515, mSK 517, mPK 519) using a variety of key derivation functions (KDF 513, 516, 518). The salt 515 is used to generate a salted hash 514 based on the negotiated configuration 512. The mSK 517 is a ranging key derived on a per-session basis from the session key 511. The mPK 519 is a privacy key that is used to enhance the privacy of the secure ranging process. For example, in one embodiment the mPK 519 can be used to encrypt the anti-replay counter value transmitted in the type 1 frame.

The salted hash 514 is generated in part using a negotiated configuration 512. The negotiated configuration 512 specifies various details of the operation of the secure ranging system, including details that impact the security of the system. For example, in one embodiment, the negotiated configuration 512 can be used to influence, for example, the initial value of the anti-replay counter value 531, when the counter is incremented, and which set values are reserved for each endpoint involved in the protocol. A salted hash is generated from the negotiated configuration 512 using the salt 515. Using a salted hash derived from the negotiated configuration 512 enables detection of attempts to modify the configuration details negotiated by devices within the system. In one embodiment, the negotiated configuration 512 is determined outside of the security boundary, potentially allowing an attacker having access to the application processor to attempt a collision attack, such that two generated configurations yield the same hash. If the attacker were to find a collision, the attacker may be able to force the use of a modified configuration, allowing the attacker to gain advantage during an attack.

In various embodiments, key derivation functions described herein are compliant with the "Recommendation for Key Derivation Using Pseudorandom Functions," NIST Special Publication 800-108. Exemplary key derivation functions can include key derivation functions that use the counter mode, in which the output of the pseudorandom function (PRF) used in the KDF is computed with a counter as the iteration variable. In various embodiments, the KDFs used to compute the illustrated cryptographic material can each use the same or different PRFs. For example, a keyed-hash message authentication code (HMAC) or a cipher-based Message Authentication Code (CMAC) can be used. In one embodiment, the AES256-CMAC and/or AES128-CMAC can be used. In various embodiments, keys of various lengths can be generated. For some KDFs, the length of the key derivation key is defined by the PRF used for the key derivation. However, some PRFs can accommodate different key lengths. If the HMAC is used as the PRF, then a KDF can use a key derivation key of essentially any length. In various embodiments, key lengths of between 128-bits and 256 bits are used, although embodiments are not limited to any specific key length.

In one embodiment, a dRK 522 and dDK 523 are generated each ranging cycle using a key derivation function cascade (KDF cascade 521). The KDF cascade 521 is a nested cascade of multiple key derivation functions. The use of a cascade of KDFs can enhance side channel attack resistance by concentrating multiple key derivation phases into a single step, such that the derivation of key materials is performed in a cascading manner. For example, a derived key (dKey) can be generated in a cascaded manner based on a session key (e.g., mSK 517) and a set of one or more parameters (e.g., param1, param2, param3, etc.), such that dKey=KDF(KDF(KDF(mSK, param1), param2), param3). The use of a cascade can provide side channel attack resistance by reducing the amount of data that may be captured during key derivation. Any number of key derivation functions can be used, with any number of additional input parameters used as diversification data during generation of the derived keys.

In some embodiments, dRK 522 and dDK 523 are derived from on the message session (mSK 517) and key diversification data derived in part from the current anti-replay counter value 531. In some embodiments, the current anti-replay counter can be distributed throughout the key diversification data provided to the key derivation functions, generating sparse ranging input to provide to the key derivation functions. For example, one or more bits from the current anti-replay counter can be inserted into each byte of the diversification data. Alternatively, one or more bits of the anti-replay counter can be distributed throughout the inputs applied to each key derivation function.

Spreading the bits of the anti-replay counter throughout the diversification data, or other key derivation function input, can reduce the likelihood that the secret material can be captured via the use of side channel attacks such as differential power analysis. This technique can be particularly effective when the KDF is based on the AES block cipher. For the first block of the derivation process used in the KDF cascade 521, if only one bit of the counter is distributed to one byte of the diversification data, then only two inputs are available to attack the AES sub-byte of first round and only 16 different inputs are available to attack mix columns of the first round. As such, attacks are not practical provided minimal assumptions on the leakage model of the cryptographic implementation of the system. For the second block, it can be assumed that an adversary does not know the forward block (output of the previous block). The Message block can be XORd with the forward block. As the message block is sparse, the adversary in the worst case only recovers the corresponding 16-bits of the forward block and therefore knows the sparse 16-bit input of the second AES block. Other bits of this second block are varying but unknown. The known 16 bits of the input of the second block being sparse, the adversary cannot recover the key during the processing of the second block. The same reasoning applies on subsequent blocks of the CMAC operation with mSK 517. For the last block, steps are taken to ensure that the output of the KDF cascade 521 is not known so that the adversary cannot perform a side channel attack on the last rounds of the last AES block. Therefore a one way function (CMAC) is used in the key derivation to derive the dRK 522 and dDK 523 with no variable input.

The secure preambles 540 can be generated using a cryptographically secure pseudo-random number generator (CSPRNG 536) from the anti-replay counter value 531, salted hash 514, and dRK 522. In one embodiment, the secure preambles are generated using techniques such as those illustrated in FIG. 4, where the salted hash 514, anti-replay counter, and dRK are used as seed data (e.g., seed 419, 451). The type 1 frame ciphertext 541, and type 2 frame ciphertext 542 can be generated on a per-frame basis using the AES-CCM-128 security suite (e.g., CCM 538, CCM 539), which uses a cipher block chaining message authentication code technique. Data is encrypted using a block cipher algorithm in cipher block chaining mode to create a chain of blocks. Each block depends on the proper encryption of the previous block, creating an interdependence that ensures that a change to any of the plaintext bits will cause the final encrypted block to change in a way that cannot be predicted or counteracted without knowing the key to the block cipher. The use of AES-CCM enables both data encryption and validation of data authenticity. While the use of CCM is illustrated, other authenticated encryption functions can also be used instead of CCM.

In one embodiment, CCM 538, 539 represent cryptographic accelerators within the ranging radio and/or secure processors. In one embodiment, the plaintext data, keys, and the resulting ciphertext are exchanged over a secure interface between a ranging radio and a secure processor. In one embodiment, the ranging radio includes secure memory to store key material and cryptographic accelerators to encrypt ranging data frames before transmission. In one embodiment, one or more ranging radios and a secure processor share secure memory and the secure processor can be used to encrypt frame data before transmission by the ranging radio. In one embodiment, the secure processor is used to generate a portion of the key material (e.g., session key 511), while the operations of key derivation system 500 is are performed on the ranging radio.

Figure 6:
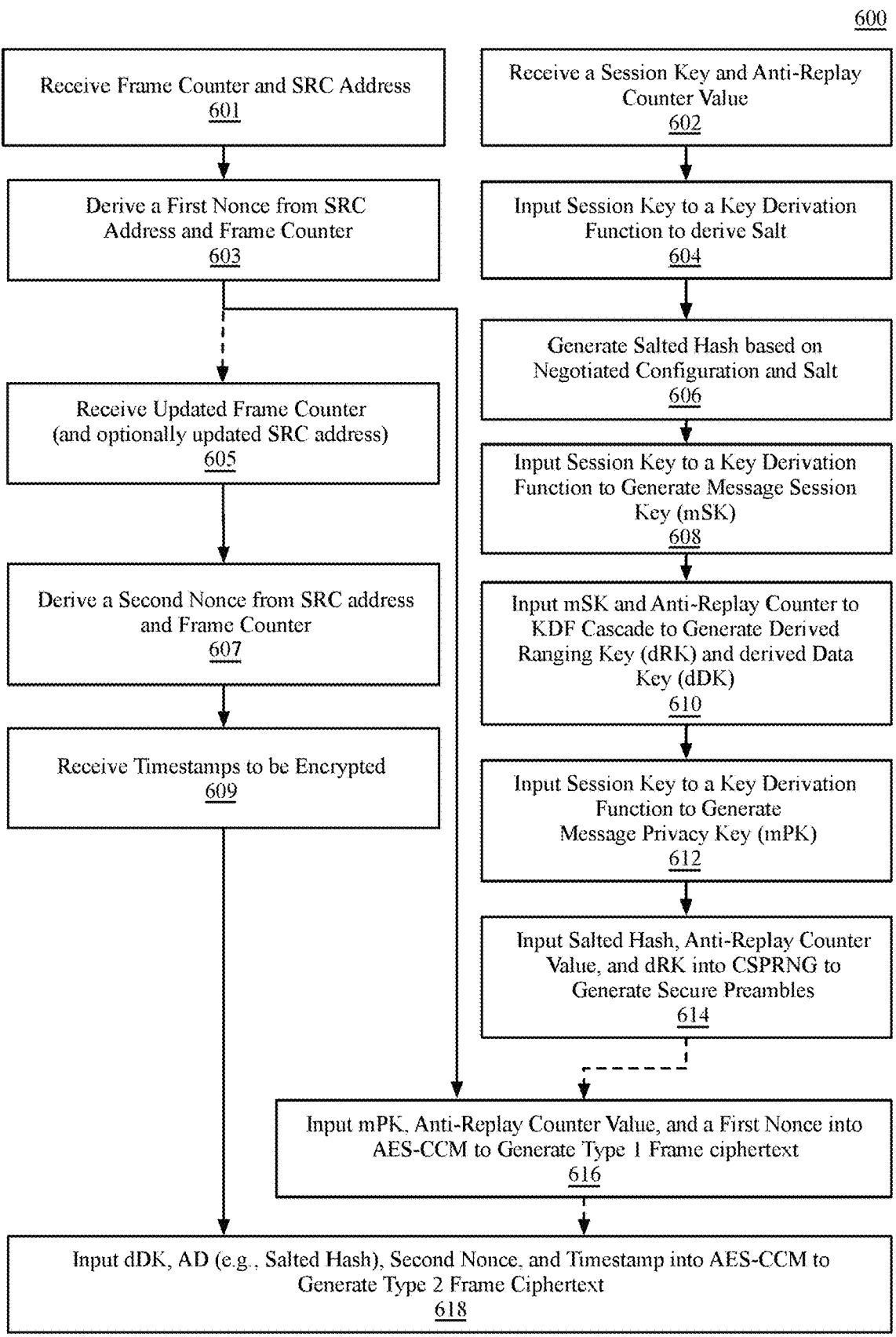
FIG. 6 is a flowchart that illustrates key derivation and ciphertext generation, according to an embodiment.

FIG. 6 is a flowchart that illustrates a process 600 of key derivation and ciphertext generation, according to an embodiment. Process 600 can be performed by a ranging radio and/or secure processor as described herein to implement a key derivation system such as the key derivation system 500 as in FIG. 5. Various operations of process 600 can be precomputed or performed in parallel with other operations. Precomputation, for example, can be performed to relax the latency requirements on the key derivation functions. Additionally, in one embodiment a ranging radio as described herein can parallelize receiver operations and cryptographic operations, in which some key derivation or encryption operations used to generate a frame for transmission are performed while receiving an incoming frame.

In one embodiment, operations of process 600 include to receive a frame counter and source address, as shown at block 601 and to receive a session key and anti-replay counter value, as shown at block 602. In one embodiment, the anti-replay counter received at block 602 can be generated locally. In one embodiment, an initial value for the anti-replay counter can be received and new values can be generated by periodically incrementing the anti-replay counter. In such embodiment, the ranging configuration negotiated between devices can determine the rate at which the anti-replay counter is updated. At block 603 the frame counter and source address can be used to derive a first nonce from the source address and frame counter. Derivation of the first nonce at block 603, can also include the use of additional inputs to reduce the probability of repetition. In one embodiment, a session identifier is provided as additional input. At block 604, the session key and anti-replay counter value received at block 602 can be input into a key derivation function to derive a salt. At block 606, a salted hash can be generated based on a negotiated configuration and the salt derived at block 604. At block 608, the session key is input into a key derivation function to generate the mSK. At block 610, the mSK and anti-replay counter are input into a key derivation function cascade to generate the dRK and dDK. In one embodiment, the mSK and anti-replay counter are combined using a key derivation cascade and sparse data input based derivation as a side channel attack countermeasure. At block 612, the session key is input into a key derivation function to generate the mPK. At bock 614, the anti-replay counter value received at block 602, the salted hash generated at block 606, and the dRK generated at block 610 can be provided to a CSPRNG to generate secure preambles. At block 616, the mPK generated at block 612, the anti-replay counter value received at block 602, and the first nonce derived at block 603 can be provided to AES-CCM logic to generate type 1 frame ciphertext that is transferred within a type 1 frame, such as the type 1 frame 340 of FIG. 3B.

During process 600, one or more input values may be updated, changed, or incremented on a per-frame basis. In one embodiment, the frame counter value received at block 601, and used to generate the first nonce at block 603, can be updated at block 605. Optionally, an updated source address can also be received at block 605. The updated frame counter and potentially updated source address can then be used derive a second nonce at block 607. In one embodiment, other additional inputs, such as a session identifier, may be used to derive the second nonce at block 607. In general, the frame counter can be incremented each frame. However, in one embodiment the updated frame counter received at block can be non-sequential to the frame counter received at block 601 in the event of a source address change. The source address associated with a frame can be periodically rolled or randomized to enhance device privacy. Bluetooth and UWB addresses described herein can be configured with a privacy function that causes addresses within advertising packets to be replaced with a random value that changes at certain intervals, preventing a malicious attacker from determining that a series of different, randomly generated addresses are actually related to the same physical device. Accordingly, when the source address changes at block 605, the frame counter can also be reset to prevent the leakage of information that can be used to compromise the privacy of a user.

The second nonce can be used to encrypt timestamps received at block 609. At block 618, authenticated data, which can be or include the salted hash generated at block 606, can be input to AES-CCM logic along with the dDK generated at block 610, the second nonce derived at block 607, and the timestamps received at block 609 to generate ciphertext that is transferred within a type 2 frame, such as the type 2 frame 350 of FIG. 3B.

Figure 7:
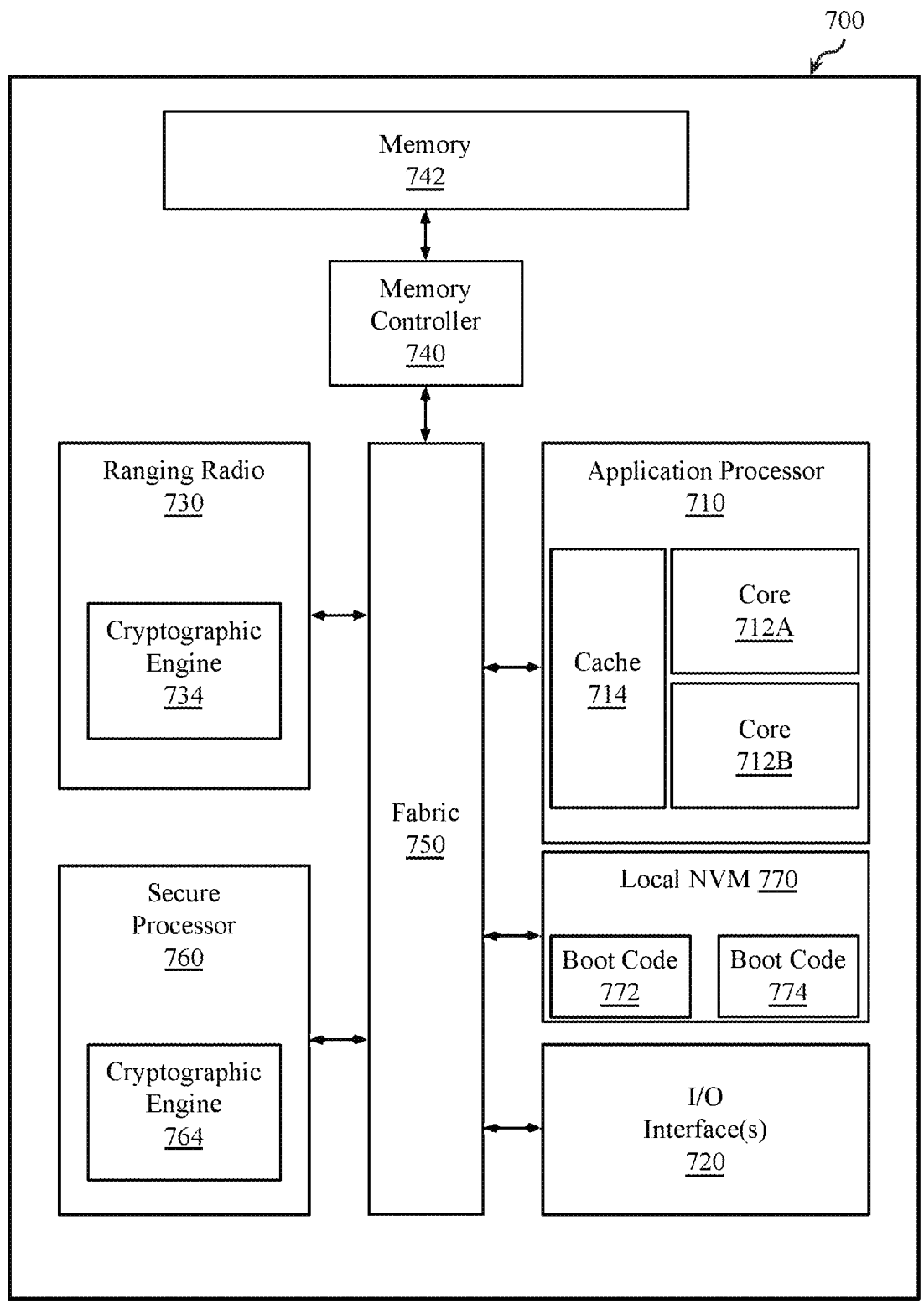
FIG. 7 illustrates an exemplary processing system suitable for the generation of cryptographic material for ranging operations, according to an embodiment.

FIG. 7 illustrates an exemplary processing system 700 suitable for the generation of cryptographic material for ranging operations, according to an embodiment. In one embodiment the processing system 700 includes a multi-core application processor 710 and a crossbar fabric 750 that enables communication within the processing system 700, although a system bus may also be used in other embodiments. The crossbar fabric 750 can couple a memory controller 740 and a memory 742 to other components of the processing system 700. In one embodiment the application processor 710 includes multiple cores 712A-712B and at least one cache 714. The application processor 710 can facilitate execution of various applications on an electronic device, such as a smartphone, table, wearable device, or other electronic devices described herein. The application processor 710 can then securely boot using boot code 722 stored on local non-volatile memory 770, which can be a separate storage device than the primary non-volatile memory of the system, or can be a secure portion of the primary non-volatile memory. The boot code can be accompanied by verification code 774 that can be used verify that the boot code 772 has not been modified.

The processing system 700 also includes a secure processor 760, which can be any secure processor described herein, such as but not limited to a secure enclave processor (SEP), a secure element, or a trusted platform module (TPM). The secure processor 760 includes a secure circuit configured to maintain user keys for encrypting and decrypting data keys associated with a user. As used herein, the term "secure circuit" refers to a circuit that protects an isolated, internal resource from being directly accessed by any external circuits. The secure processor 760 can be used to secure communication with the peripherals connected via the I/O interface(s) 720. The secure processor 760 can include a cryptographic engine 764 that includes circuitry to perform cryptographic operations for the secure processor 760. The cryptographic operations can include the encryption and decryption of data keys that are used to perform storage volume encryption or other data encryption operations within a system.

The processing system 700 can also include a ranging radio 730, which can be an ultra-wide band radio used to perform secure ranging as described herein. The ranging radio 730 can also include a cryptographic engine 734 to enable derivation of cryptographic materials and encryption of ranging data transmitted during the secure ranging process. The cryptographic engine 734 can work in concert with the cryptographic engine 764 within the secure processor 760 to enable high-speed and secure encryption and decryption of ranging data during the ranging process. The cryptographic engine 734 in the ranging radio 730 and the cryptographic engine 764 in the secure processor may each implement any suitable encryption algorithm such as the Data Encryption Standard (DES), Advanced Encryption Standard (AES), Rivest Shamir it Adleman (RSA), or Elliptic Curve Cryptography (ECC) based encryption algorithms.

Figure 8:
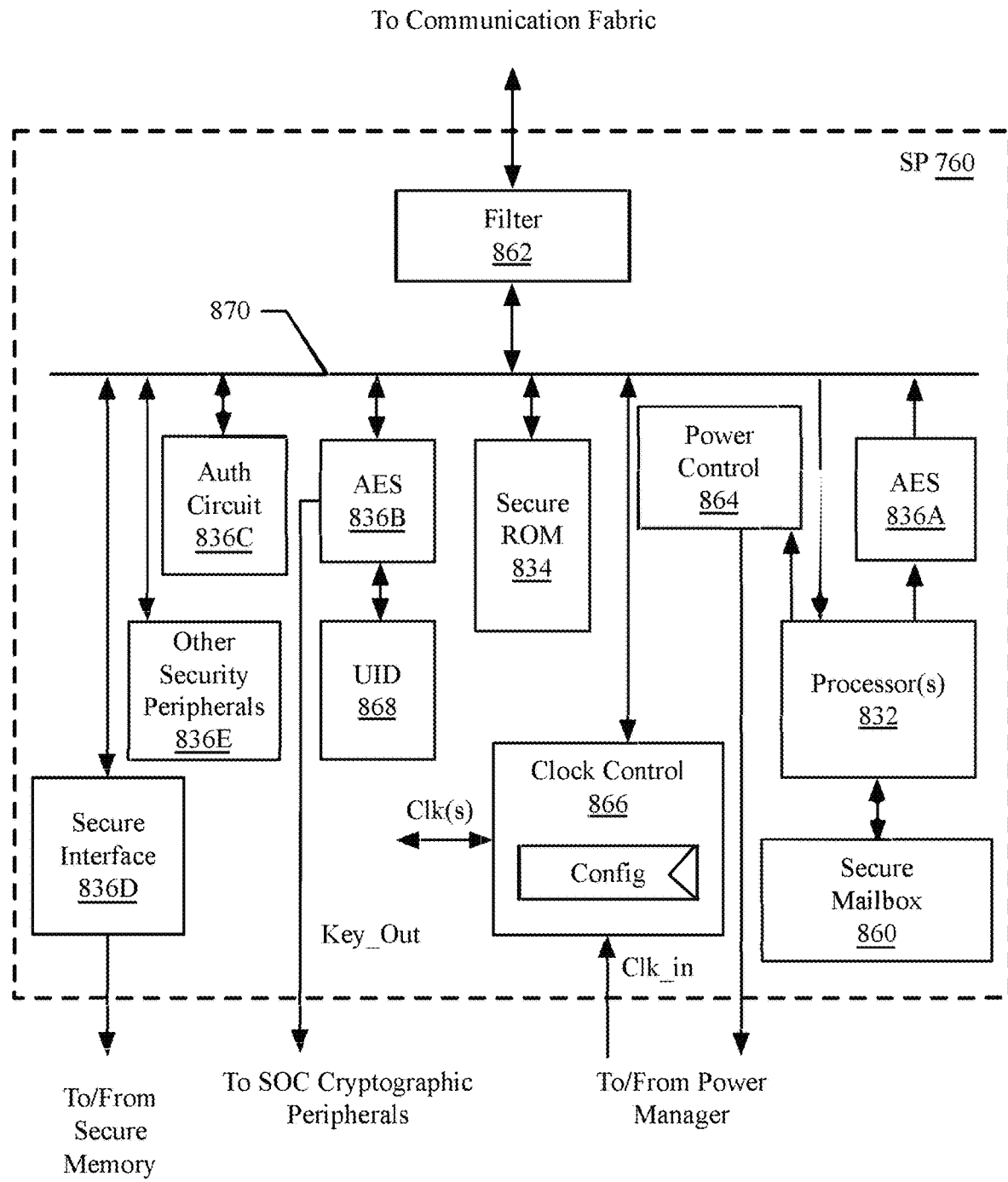
FIG. 8 illustrates an exemplary secure processor including hardware to enable cryptographic acceleration.

FIG. 8 is block diagram illustrating a secure processor 760, according to an embodiment. In the illustrated embodiment, the secure processor 760 includes one or more core processor(s) 832, security peripherals 836A-836E, the secure ROM 834, secure mailbox 860, filter 862, power control unit 864, clock control unit 866, and a unique identifier (UID) 868. The filter 862 may be coupled to the fabric 750 of FIG. 7 and to a local interconnect 870 to which the other components of the secure processor 760 are also coupled. The local interconnect 870 can be configured as a bus-based interconnect or another interconnect such as a packet-based, hierarchical, point-to-point, or cross bar fabric. In one embodiment, the security peripherals 836A-836E coupled with the local interconnect 870 include a set of AES encryption engines 836A-836B, an authentication circuit 836C, a secure interface unit 836D, and other security peripherals 836E.

In one embodiment a first AES encryption engine 836A can couple to the processor(s) 832. The processor(s) 832 are one or more processor cores that manage operations within the secure processor. The processor(s) 832 can execute a secure operating system that is separate from the host operating system, such as the operating system executed by the processing system 700 of FIG. 7. In one embodiment the secure processor operating system is a micro-kernel based operating system that is optimized for mobile or embedded processors. The processor(s) 832 can couple with the secure mailbox 860 and the power control unit 864. The power control unit 864 can be coupled to the clock control unit 866 and an external power manager. The clock control unit 866 can also be coupled to the power manager, which can an input clock signal. The clock control unit 866 can then provide clock signals to the other components of the secure processor 760. In one embodiment a second AES encryption engine 836B can couple with a set of fuses that define the UID 868, which at least quasi-uniquely identifies the specific device that includes the secure processor 760. The second AES encryption engine 836B may be responsible for secure key generation and can output generated keys to cryptographic circuits and/or other circuitry within the SoC that houses the secure processor 760, such as the cryptographic engine 734 within the ranging radio 730 of FIG. 7.

In one embodiment the filter 862 can be configured to tightly control access to the secure processor 760 to increase the isolation of the secure processor from the rest of the SoC that contains the secure processor (e.g., processing system 700 of FIG. 7). In an embodiment, the filter 862 may permit read/write operations from the communication fabric (e.g., fabric 750 of FIG. 7) to enter the secure processor 760 only if the operations address the secure mailbox 860. The secure mailbox 860 may include an inbox and an outbox, which each may be first-in, first-out (FIFO) buffers. The FIFO buffers may have any size and can contain any number of entries, where each entry can store data from a read or write operation. In one embodiment the inbox is configured to store write data from write operations sourced from the fabric (e.g., fabric 750 of FIG. 7.), while the outbox can store write data from write operations sourced by the processor(s) 832. In one embodiment the filter 862 can permit write operations to the address assigned to the inbox portion of the secure mailbox 860 and read operations to the address assigned to the outbox portion of the secure mailbox 860. All other read/write operations may be discarded or blocked by the filter 862.

In one embodiment the filter 862 responds to other read/write operations with an error and can sink write data associated with a filtered write operation without passing the write data on to the local interconnect 870. In one embodiment, the filter 862 can also supply nonce data as read data for a read operation that is filtered. The supplied nonce data can be any data that is unrelated to the address resource within the secure processor 760, and may be all zeros, all ones, random data from a random number generator, data programmed into the filter 762 to respond as read data, the address of the read transaction, or other data. In an embodiment, the filter 862 only filters incoming read/write operations, allowing components within the secure processor 760 to have full access to other components to which the secure processor is integrated. In such embodiment the filter 862 will not filter responses from the SoC fabric that are provided in response to read/write operations issued by the secure processor 760.

In one embodiment, write data for write operations generated by the processor(s) 832 that are to be transmitted by the secure processor 760 may optionally be encrypted by an AES encryption engine 836. An attribute of the write operation issued by the processor(s) 832 may indicate whether data is to be encrypted. The attribute may be a packet field, in packet-based embodiments, a signal transmitted with the write operation, in bus-based embodiments, or may be transmitted in any other desired fashion. In the illustrated embodiment, the encryption circuit 836A may implement encryption that is compatible with the AES. However, other embodiments may implement any encryption algorithm, including but not limited to ECC, RSA, or DES encryption.

The power control unit 864 may be configured to control the power gating of the secure processor 760. The power control unit 864 may be coupled to processor(s) 832, and may monitor the processor to determine when power gating is to be requested. Responsive to determining that power gating is to be requested, the power control unit 864 can transmit a power gating request to an external power manager. The power manager can determine that the secure processor 760 is to be powered gated, and may then power gate the secure processor 760. The power control unit 864 may also be configured to control clock gating in the secure processor 760. Alternatively, the clock control unit 766 may be configured to control the clock gating in the secure processor 760. Clock gating may be controlled locally, or may be requested from the power manager in various embodiments.

The clock control unit 866 may be configured to control the local clocks in the secure processor 760. The clock control unit 866 may be coupled to receive an input clock and may generate the clocks local to the secure processor 760. The clock control unit 766 may be programmable (e.g. by processor(s) 832) with clock ratios, clock enables, clock gating enables, etc. for the various clocks in the secure processor 760.

The secure ROM 834 is coupled to the local interconnect 870, and may respond to an address range assigned to the secure ROM 834 on the local interconnect 870. The address range may be hardwired, and the processor(s) 832 may be hardwired to fetch from the address range at boot to boot from the secure ROM 834. The secure ROM 834 may include the boot code for the secure processor 760 as well as other software executed by processor(s) 832 during use (e.g. the code to process inbox messages and generate outbox messages, code to interface to the security peripherals 836A-836E, etc.). In an embodiment, the secure ROM 834 may store all the code that is executed by the processor(s) 832 during use.

In one embodiment the security peripherals 836A-836E include an authentication circuit 836C that is used to perform authentication operations for the secure processor 760. The authentication circuit 836C may implement one or more authentication algorithms, such as but not limited to a secure hash algorithm (SHA) such as SHA-1, SHA-2, SHA-3, or any other authentication algorithm. In one embodiment the authentication circuit can work in concert with various other security peripherals 836E within the secure processor 760.

In addition to security peripherals designed to perform specific functions, there may also be security peripherals that are interface units for secure interfaces such as the secure interface unit 836D. In the illustrated embodiment the secure interface unit 836D is an interface to an off-chip secure memory that may be used to secure storage by the secure processor 760. The secure memory can be encrypted using an ephemeral key that is based in part on the UID 868. The ephemeral key is occasionally re-generated. For example, in one embodiment the secure processor 760 can re-generate the ephemeral key during each boot cycle. Only the secure processor 760 has access to the ephemeral key used to access secure memory. The secure memory enables the secure processor 760 to have secure access to system memory to store data that may not fit within memory internal to the secure processor 760.

In some embodiments, the security peripherals 836A-836E within the secure processor 760 can also be included in a ranging radio as described herein. For example, the cryptographic engine 734 of the ranging radio 730 of FIG. 7 can include logic similar to the security peripherals 836A-836E, as well as other encryption acceleration logic found within the secure processor 760.

Figure 9:
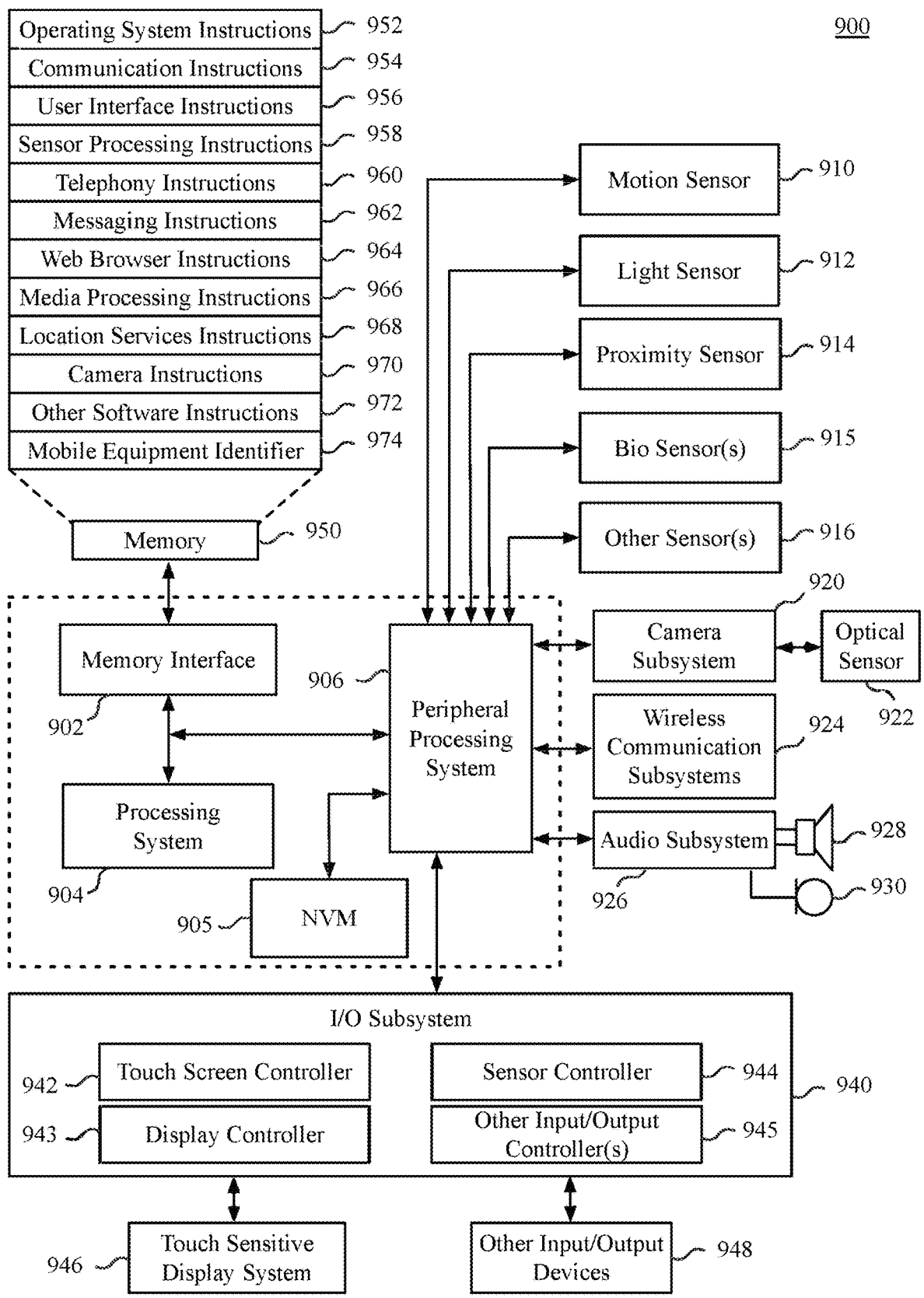
FIG. 9 shows a mobile data processing and sensor system for a mobile device, according to embodiments described herein.

FIG. 9 is a block diagram of a computing device architecture 900, according to an embodiment. The computing device architecture 900 includes a memory interface 902, a processing system 904, and a peripherals processing system 906. The various components can be coupled by one or more communication buses, fabrics, or signal lines. The various components can be separate logical components or devices or can be integrated in one or more integrated circuits, such as in a system on a chip integrated circuit. The processing system 904 may include multiple processors and/or co-processors. The various processors within the processing system 904 can be similar in architecture or the processing system 904 can be a heterogeneous processing system. In one embodiment the processing system 904 is a heterogeneous processing system including one or more data processors, image processors and/or graphics processing units.

The memory interface 902 can be coupled to memory 950, which can include high-speed random access memory such as static random access memory (SRAM) or dynamic random access memory (DRAM). The memory can store runtime information, data, and/or instructions are persistently stored in non-volatile memory 905, such as but not limited to flash memory (e.g., NAND flash, NOR flash, etc.). Additionally, at least a portion of the memory 950 is non-volatile memory. The connection between the processing system 904 and memory interface 902 to the non-volatile memory 905 can be facilitated via the peripherals processing system 906.

Sensors, devices, and subsystems can be coupled to the peripherals processing system 906 to facilitate multiple functionalities. For example, a motion sensor 910, a light sensor 912, and a proximity sensor 914 can be coupled to the peripherals processing system 906 to facilitate the mobile device functionality. Other sensors 916 can also be connected to the peripherals processing system 906, such as a positioning system (e.g., GPS receiver), a temperature sensor, a biometric sensor, or other sensing device, to facilitate related functionalities. A camera subsystem 920 and an optical sensor 922, e.g., a charged coupled device (CCD) or a complementary metal-oxide semiconductor (CMOS) optical sensor, can be utilized to facilitate camera functions, such as recording photographs and video clips.

The peripherals processing system 906 can enable a connection to communication peripherals including one or more wireless communication subsystems 924, which can include radio frequency receivers and transmitters and/or optical (e.g., infrared) receivers and transmitters. The specific design and implementation of the wireless communication subsystems 924 can depend on the communication network(s) over which a mobile device is intended to operate. For example, a mobile device including the illustrated computing device architecture 900 can include wireless communication subsystems 924 designed to operate over a network using Time Division, Multiple Access (TDMA) protocols, Global System for Mobile Communications (GSM) protocols, Code Division, Multiple Access (CDMA) protocols, Long Term Evolution (LTE) protocols, and/or any other type of wireless communications protocol.

The wireless communication subsystems 924 can provide a communications mechanism over which a client browser application can retrieve resources from a remote web server. The peripherals processing system 906 can also enable an interconnect to an audio subsystem 926, which can be coupled to a speaker 928 and a microphone 930 to facilitate voice-enabled functions, such as voice recognition, voice replication, digital recording, and telephony functions.

The peripherals processing system 906 can enable a connection to an I/O subsystem 940 that includes a touch screen controller 942 and/or other input controller(s) 945. The touch screen controller 942 can be coupled to a touch sensitive display system 946 (e.g., touch-screen). The touch sensitive display system 946 and touch screen controller 942 can, for example, detect contact and movement and/or pressure using any of a plurality of touch and pressure sensing technologies, including but not limited to capacitive, resistive, infrared, and surface acoustic wave technologies, as well as other proximity sensor arrays or other elements for determining one or more points of contact with a touch sensitive display system 946. Display output for the touch sensitive display system 946 can be generated by a display controller 943. In one embodiment the display controller 943 can provide frame data to the touch sensitive display system 946 at a variable frame rate.

In one embodiment a sensor controller 944 is included to monitor, control, and/or processes data received from one or more of the motion sensor 910, light sensor 912, proximity sensor 914, or other sensors 916. The sensor controller 944 can include logic to interpret sensor data to determine the occurrence of one of more motion events or activities by analysis of the sensor data from the sensors.

In one embodiment the peripherals processing system 906 can also enable a connection to one or more bio sensor(s) 915. A bio sensor can be configured to detect biometric data for a user of computing device. Biometric data may be data that at least quasi-uniquely identifies the user among other humans based on the user's physical or behavioral characteristics. For example, in some embodiments the bio sensor(s) 915 can include a finger print sensor that captures fingerprint data from the user. In another embodiment, bio sensor(s) 915 include a camera that captures facial information from a user's face. In some embodiments the bio sensor(s) 915 can maintain previously captured biometric data of an authorized user and compare the captured biometric data against newly received biometric data to authenticate a user.

In one embodiment the I/O subsystem 940 includes other input controller(s) 945 that can be coupled to other input/ control devices 948, such as one or more buttons, rocker switches, thumb-wheel, infrared port, USB port, and/or a pointer device such as a stylus, or control devices such as an up/down button for volume control of the speaker 928 and/or the microphone 930.

In one embodiment, the memory 950 coupled to the memory interface 902 can store instructions for an operating system 952, including portable operating system interface (POSIX) compliant and non-compliant operating system or an embedded operating system. The operating system 952 may include instructions for handling basic system services and for performing hardware dependent tasks. In some implementations, the operating system 952 can be a kernel or micro-kernel based operating system.

The memory 950 can also store communication instructions 954 to facilitate communicating with one or more additional devices, one or more computers and/or one or more servers, for example, to retrieve web resources from remote web servers. The memory 950 can also include user interface instructions 956, including graphical user interface instructions to facilitate graphic user interface processing.

Additionally, the memory 950 can store sensor processing instructions 958 to facilitate sensor-related processing and functions; telephony instructions 960 to facilitate telephone-related processes and functions; messaging instructions 962 to facilitate electronic-messaging related processes and functions; web browser instructions 964 to facilitate web browsing-related processes and functions; media processing instructions 966 to facilitate media processing-related processes and functions; location services instructions including GPS and/or navigation instructions 968 and Wi-Fi based location instructions to facilitate location based functionality; camera instructions 970 to facilitate camera-related processes and functions; and/or other software instructions 972 to facilitate other processes and functions, e.g., security processes and functions, and processes and functions related to the systems. The memory 950 may also store other software instructions such as web video instructions to facilitate web video-related processes and functions; and/or web shopping instructions to facilitate web shopping-related processes and functions. In some implementations, the media processing instructions 966 are divided into audio processing instructions and video processing instructions to facilitate audio processing-related processes and functions and video processing-related processes and functions, respectively. A mobile equipment identifier, such as an International Mobile Equipment Identity (IMEI) 974 or a similar hardware identifier can also be stored in memory 950.

Each of the above identified instructions and applications can correspond to a set of instructions for performing one or more functions described above. These instructions need not be implemented as separate software programs, procedures, or modules. The memory 950 can include additional instructions or fewer instructions. Furthermore, various functions may be implemented in hardware and/or in software, including in one or more signal processing and/or application specific integrated circuits.

In the foregoing specification, the generation of cryptographic material for ranging operation has been described with reference to specific embodiments. It will, however, be evident that various modifications and changes can be made thereto without departing from the broader spirit and scope of the invention. The specification and drawings are, accordingly, to be regarded in an illustrative rather than a restrictive sense. The specifics in the descriptions and examples provided may be used anywhere in one or more embodiments.

The various features of the different embodiments or examples may be variously combined with some features included and others excluded to suit a variety of different applications. Examples may include subject matter such as a method, means for performing acts of the method, at least one machine-readable medium including instructions that, when performed by a machine cause the machine to perform acts of the method, or of an apparatus or system according to embodiments and examples described herein. Additionally various components described herein can be a means for performing the operations or functions described in accordance with an embodiment.

Embodiments described herein enable the generation of cryptographic material for ranging operations in a manner that reduces and obfuscates potential correlations between leaked and secret information. Additionally, embodiments can enable enhanced security relative to secure ranging systems known in the art and can enhance user privacy by reducing the ability of electronic devices to be tracked via wireless emissions. The techniques described herein can also be applied to reduce the expense and design complexity associated with the physically shielding cryptographic accelerators to reduce information leakage during secure ranging operations.

Embodiments described herein enable the generation of cryptographic material for ranging operations in a manner that reduces and obfuscates potential correlations between leaked and secret information. One embodiment provides for an apparatus including a ranging module having one or more ranging sensors. The ranging module is coupled to a secure processing system through a hardware interface to receive at least one encrypted ranging session key, the ranging module to decrypt the at least one encrypted ranging session key to generate a ranging session key, generate a sparse ranging input, derive a message session key based on the ranging session key, and derive a derived ranging key via a key derivation cascade applied to the message session key and the sparse ranging input, the derived ranging key to encrypt data transmitted during a ranging session.

In a further embodiment the ranging apparatus additionally comprises a cryptographic engine to derive at least the message session key and derived ranging key via a key derivation function. The cryptographic engine can derive the message session key via application of the key derivation function to the ranging session key and derive the derived ranging key via application of the key derivation cascade to the message session key and the sparse ranging input. In one embodiment, the key derivation function is based on a keyed-hash message authentication code or a cipher-based message authentication code and the key derivation cascade includes a nested cascade of multiple key derivation functions. The key derivation cascade can be used to enhance resistance of the ranging module to a side channel attack.

In one embodiment the sparse ranging input includes diversification data having bits of an anti-replay counter value distributed throughout, wherein the diversification data is an input parameter of one or more key derivation functions of the key derivation function cascade. The anti-replay counter is a value that is used to generate a secure preamble for a ranging frame, wherein the ranging frame is a data packet transmitted or received during the ranging session. The sparse ranging input can be used to enhance resistance of the ranging module to a side channel attack during execution of the key derivation cascade. The ranging module can use the transmitted encrypted data to determine a time of flight for data transmitted during the ranging session and determine a range based on the time of flight.

One embodiment provides for a method of securing a ranging operation, the method comprising receiving a ranging session key and an anti-replay counter value, the anti-replay counter value used to generate a secure preamble for a ranging frame; deriving a message session key based on the ranging session key; generating a sparse ranging input based on the anti-replay counter value and diversification data; deriving a derived ranging key via the sparse ranging input and the message session key; and encrypting data transmitted within the ranging frame via the derived ranging key, wherein the ranging frame is a data packet transmitted or received during a ranging session of the ranging operation.

In one embodiment, deriving the derived ranging key includes providing the sparse ranging input and the message session key to a cascade of multiple key derivation functions and generating the sparse ranging input includes spreading bits of the anti-replay counter value throughout the diversification data. The diversification data is an input parameter of one or more key derivation functions of the cascade of multiple key derivation functions.

One embodiment provides for a data processing system comprising a secure processing system including a secure processor and a secure processor firmware, a secure boot read only memory (ROM) and a cryptographic accelerator and a secure storage for storing one or more private keys for use in a cryptographic system; an application processing system which includes a boot ROM and one or more system buses, the application processing system configured to execute one or more user applications and an operating system; a system memory coupled to one or more system buses to store the operating system and the one or more user applications; and a ranging module including one or more ranging sensors, the ranging module coupled to the secure processing system through a hardware interface to receive at least one encrypted ranging session key, the ranging module to decrypt the at least one encrypted ranging session key to generate a ranging session key, generate a sparse ranging input, derive a message session key based on the ranging session key, and derive a derived ranging key via a key derivation cascade applied to the message session key and the sparse ranging input, the derived ranging key to encrypt data transmitted during a ranging session.

Embodiments described herein can include methods, data processing systems, and non-transitory machine-readable media.

Other features of the present embodiments will be apparent from the accompanying drawings and from the detailed description above. Accordingly, the true scope of the embodiments will become apparent to the skilled practitioner upon a study of the drawings, specification, and following claims.

What is claimed is:

1. An electronic device comprising:
 a ranging module including one or more ranging sensors, the ranging module coupled to a secure processing system through a hardware interface, the ranging module configured to:
 receive at least one encrypted ranging session key;
 decrypt the at least one encrypted ranging session key to generate a ranging session key;
 generate a sparse ranging input;
 derive, using a cryptographic engine, a message session key based on the ranging session key; and
 derive, using the cryptographic engine, a derived ranging key via a key derivation function applied to the message session key and the sparse ranging input, the derived ranging key configured to encrypt data transmitted during a ranging session.

2. The electronic device of claim 1, wherein the cryptographic engine is configured to derive the message session key via application of the key derivation function to the ranging session key.

3. The electronic device of claim 1, wherein the key derivation function is based on a keyed-hash message authentication code or a cipher-based message authentication code.

4. The electronic device of claim 1, wherein the key derivation function includes a nested cascade of multiple key derivation functions to enhance resistance of the ranging module to side channel attack.

5. The electronic device of claim 1, wherein the sparse ranging input includes diversification data having bits of an anti-replay counter value distributed throughout.

6. The electronic device of claim 5, wherein the diversification data is an input parameter of one or more key derivation functions of the key derivation function cascade.

7. The electronic device of claim 6, wherein the anti-replay counter value is used to generate a secure preamble for a ranging frame, wherein the ranging frame is a data packet transmitted or received during the ranging session and the sparse ranging input is to enhance resistance of the ranging module to side channel attack during execution of the one or more key derivation functions.

8. The electronic device of claim 1, wherein the ranging module determines a time of flight for data transmitted during the ranging session and determines a range based on the time of flight.

9. The electronic device of claim 1, wherein the electronic device comprises a mobile device.

10. The electronic device of claim 1, wherein the electronic device comprises a wearable device.

11. A method of securing a ranging operation, the method comprising:
 accessing a ranging session key and an anti-replay counter value;
 deriving a message session key based on the ranging session key;
 generating a sparse ranging input based on the anti-replay counter value;
 deriving a derived ranging key via a key derivation function applied to the sparse ranging input and the message session key; and
 encrypting data transmitted within a ranging frame via the derived ranging key, wherein the ranging frame is a data packet transmitted or received during a ranging session of the ranging operation.

12. The method of claim 11, wherein generating the sparse ranging input includes spreading bits of the anti-replay counter value throughout diversification data used in generating the sparse ranging input.

13. The method of claim 12, wherein the diversification data is an input parameter of one or more key derivation functions of a cascade of multiple key derivation functions.

14. The method of claim 11, wherein the anti-replay counter value is used to generate a secure preamble for the ranging frame, wherein the ranging frame is the data packet transmitted or received during the ranging session and the sparse ranging input is to enhance resistance of a ranging module to side channel attack during execution of the key derivation function.

15. The method of claim 11, wherein the ranging operation comprises determining a time of flight for data transmitted during the ranging session and determines a range based on the time of flight.

16. A non-transitory computer-readable storage medium comprising computer-executable instructions that, when executed by one or more processors, cause the one or more processors of an electronic device to perform operations comprising:
- accessing a ranging session key and an anti-replay counter value;
- deriving a message session key based on the ranging session key;
- generating a sparse ranging input based on the anti-replay counter value;
- deriving a derived ranging key via a key derivation function applied to the sparse ranging input and the message session key; and
- encrypting data transmitted within a ranging frame via the derived ranging key, wherein the ranging frame is a data packet transmitted or received during a ranging session of a ranging operation.

17. The non-transitory computer-readable storage medium of claim 16, wherein generating the sparse ranging input includes spreading bits of the anti-replay counter value throughout diversification data used in generating the sparse ranging input.

18. The non-transitory computer-readable storage medium of claim 16, wherein diversification data is an input parameter of one or more key derivation functions of a cascade of multiple key derivation functions.

19. The non-transitory computer-readable storage medium of claim 16, wherein the anti-replay counter value is used to generate a secure preamble for a ranging frame, wherein the ranging frame is a data packet transmitted or received during the ranging session and the sparse ranging input is to enhance resistance of a ranging module to side channel attack during execution of the key derivation function.

20. The non-transitory computer-readable storage medium of claim 16, wherein the ranging operation comprises determining a time of flight for data transmitted during the ranging session and determines a range based on the time of flight.

* * * * *